US010001695B2

(12) United States Patent
Hu et al.

(10) Patent No.: US 10,001,695 B2
(45) Date of Patent: *Jun. 19, 2018

(54) SYSTEM FOR GIGAHERTZ TO TERAHERTZ FREQUENCY SIGNAL GENERATION USING OPO AND DFG

(71) Applicant: Lockheed Martin Corporation, Bethesda, MD (US)

(72) Inventors: Yongdan Hu, Bothell, WA (US); Andrew Xing, Bothell, WA (US); Angus J. Henderson, Seattle, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/446,931

(22) Filed: Mar. 1, 2017

(65) Prior Publication Data

US 2017/0176838 A1    Jun. 22, 2017

Related U.S. Application Data

(62) Division of application No. 14/740,257, filed on Jun. 16, 2015, now Pat. No. 9,588,398, which is a division
(Continued)

(51) Int. Cl.
*G02F 1/35* (2006.01)
*G02F 1/39* (2006.01)
(Continued)

(52) U.S. Cl.
CPC .......... *G02F 1/3534* (2013.01); *G02F 1/3501* (2013.01); *G02F 1/3532* (2013.01);
(Continued)

(58) Field of Classification Search
CPC ..... G02F 1/353; G02F 1/3534; G02F 2203/13
See application file for complete search history.

(56) References Cited

U.S. PATENT DOCUMENTS

| 4,829,532 A | 5/1989 | Kane |
| 6,215,800 B1 | 4/2001 | Komine |

(Continued)

FOREIGN PATENT DOCUMENTS

CN    102386549 A    3/2012

OTHER PUBLICATIONS

Bennett, et al., "Terahertz Sensing in Corneal Tissues", "(Eventually published in Journal of Biomedical Optics vol. 16, No. 5, pp. 057003-057003-8)", May 2011, Publisher: Downloaded from: http://www.wright.edu/~elliott.brown/research/THz_Corneal_imaging_paper_1.pdf.
(Continued)

*Primary Examiner* — Daniel Petkovsek
(74) *Attorney, Agent, or Firm* — Charles A. Lemaire; Jonathan M. Rixen; Lemaire Patent Law Firm, P.L.L.C.

(57) ABSTRACT

Apparatus and method for high-power multi-function millimeter-wavelength (THz-frequency) signal generation using OPO and DFG in a single cavity. In some embodiments, the OPO-DFG cavity includes an optical parametric oscillator (OPO) non-linear material that receives pump light $I_P$ having pump-light frequency and generates two different lower intermediate frequencies of light—an OPO-signal beam $I_S$ and a spatially/temporally overlapping OPO-idler beam $I_I$. A difference-frequency generator non-linear material then receives the two intermediate-frequency beams $I_I$ and $I_S$, and the DFG then generates a THz-frequency output signal that has a frequency equal to the difference between the two intermediate frequencies. In some embodiments, a single-piece crystal of non-linear material is used for both OPO and DFG functions. Some embodiments use a bow-tie ring having four mirrors that define the optical path: an $I_P$-beam-entry mirror, an $I_P$-light-extraction mirror to remove unconverted $I_P$-beam, an $I_I$-
(Continued)

beam-extraction mirror, and an $I_S$-beam-extraction mirror, and a fifth $I_{THz}$-beam-extraction mirror.

20 Claims, 7 Drawing Sheets

Related U.S. Application Data of application No. 13/828,875, filed on Mar. 14, 2013, now Pat. No. 9,057,927.

(60) Provisional application No. 61/694,763, filed on Aug. 29, 2012.

(51) Int. Cl.
*G02F 1/355* (2006.01)
*H01S 3/00* (2006.01)
*H01S 3/067* (2006.01)

(52) U.S. Cl.
CPC ............. *G02F 1/3551* (2013.01); *G02F 1/39* (2013.01); *H01S 3/0092* (2013.01); *H01S 3/0675* (2013.01); *G02F 2001/3503* (2013.01); *G02F 2001/3507* (2013.01); *G02F 2203/13* (2013.01)

(56) References Cited

U.S. PATENT DOCUMENTS

| | | |
|---|---|---|
| 6,654,392 B1 | 11/2003 | Arbore et al. |
| 6,862,131 B2 | 3/2005 | Masuda |
| 6,940,877 B2 | 9/2005 | Hu et al. |
| 7,054,339 B1 | 5/2006 | Hu et al. |
| 7,339,718 B1 | 3/2008 | Vodopyanov et al. |
| 7,389,029 B2 | 6/2008 | Rahman et al. |
| 7,391,561 B2 | 6/2008 | Di Teodoro et al. |
| 7,421,171 B2 | 9/2008 | Ibanescu et al. |
| 7,473,898 B2 | 1/2009 | Holly et al. |
| 7,539,221 B1 | 5/2009 | Jiang et al. |
| 7,620,077 B2 | 11/2009 | Henderson |
| 7,781,737 B2 | 8/2010 | Zhdaneev |
| 7,898,731 B2 * | 3/2011 | Sharping ............... G02F 1/395 359/330 |
| 7,953,128 B2 | 5/2011 | Creeden et al. |
| 7,995,628 B2 | 8/2011 | Wu |
| 8,035,083 B1 | 10/2011 | Kozlov et al. |
| 8,165,178 B2 | 4/2012 | Henderson |
| 8,599,474 B1 | 12/2013 | Kozlov et al. |
| 9,057,927 B2 | 6/2015 | Hu |
| 9,588,398 B2 * | 3/2017 | Hu ....................... G02F 1/3534 |
| 2005/0018298 A1 | 1/2005 | Trotz et al. |
| 2010/0132581 A1 | 6/2010 | Day et al. |

OTHER PUBLICATIONS

Bennett, et al., "Terahertz Time-Lapse Imaging of Hydration in Physiological Tissues", "Society of Photo-Optical Instrumentation Engineers (SPIE)", Jan. 27, 2011, pp. 1-9.
Brown, E.R., "Fundamentals of Terrestrial Millimeter-Wave and THz Remote Sensing", "(Eventually published in: International journal of high speed electronics and systems, vol. 13, No. 4, pp. 995-1097.)", Dec. 2003, Publisher: Downloaded from: http://www.iar.unlp.edu.ar/biblio/htdocs/artic/bajad/brown_funda_03.pdf.
Brown, et al., "High Resolution THz Spectroscopy to Measure Strong THz Absorption Signatures of si-RNA in Solution", "Proceedings of NATO Advanced Research Workshop on Terahertz+Mid-Infrared Radiation: Basic Research+Applications (TERA-MIR 2009)", 2009, pp. 1-11, Publisher: Downloaded from: http://www.wright.edu/~elliott.brown/research/NATO_Chapter_Brown.pdf.
Brown, et al., "Narrow THz Spectral Signatures Through an RNA Solution in Nanofluidic Channels", "IEEE Sensors Journal", Mar. 2010, pp. 755-759, vol. 10, No. 3.
Brown, et al., "Comparison of THz and Near-IR Scattering Effects From Air-Solid Interfaces", "Infrared, Millimeter and Terahertz Waves (IRMMW-THz), 2011 36th International Conference on", Oct. 2-7, 2011, pp. 1-2, Publisher: Downloaded from: http://www.cecs.wright.edu/sites/cecs.wright.edu.research.thz/files/pubs/IRMMW_2011_THz_Scattering.pdf.
Cetnar, et al., "Finite-Element Simulation and Design of a High-Extinction-Ratio THz Wire-Grid Polarizer", "Aerospace and Electronics Conference (NAECON), 2012 IEEE National", Jul. 25-27, 2012, pp. 20-23, Publisher: Web: http://www.cecs.wright.edu/research/thz/sites/cecs.wright.edu.research.thz/files/page_attachment/Finite%20Elemant%20Simulqtion%20and%20Design.pdf.
Chen, et al., "Continuous-Wave 4.3-um IntraCavity Difference Frequency Generation in an Optical Parametric Resonator.", "PCT Examiner retrieved from internet: http://www.dtic.mil/get-tr-docipdf?AD=ADA391306", Feb. 10, 2001.
Chen, et al., "Complementary Planar Terahertz Metamaterials", "Optics Express", Feb. 5, 2007, pp. 1084-1095, vol. 15, No. 3.
Dyball, H., "Tuning into Terahertz", "Electronics letters", Apr. 26, 2010, p. 602, vol. 46, No. 9.
Latkowski, et al., "RF or THz Signals Generated From DC Biased Multimode Lasers", "In: ICTON 2007—9th International Conference on Transparent Optical Networks, Jul. 1-5, 2007, Rome, Italy.", Jul. 1-5, 2007, pp. 257-260.
Mathew, et al., "Database of all THz Signatures Measured on Solids and Liquids in the Range 100 GHz to 10 THz", "downloaded from: http://www.cecs.wright.edu/sites/cecs.wright.edu.research.thz/files/pubs/IRMMW_2011_THz_Database_Final.pdf", Oct. 2-7, 2011, pp. 1-2, Publisher: (Eventually published in: Infrared, Millimeter and Terahertz Waves (IRMMW-THz), 2011 36th International Conference on).
Middendorf, et al., "Design of Multi-Order Diffractive THz Lenses", "Infrared, Millimeter, and Terahertz Waves (IRMMW-THz), 2012 37th International Conference on", Sep. 23-28, 2012, pp. 1-2.
Rahman, Anis, "Dendrimer Terahertz Technology: Applications in Life Sciences", "Applied Research & Photonics Inc.", Oct. 22, 2008, pp. 1-39, Publisher: Downloaded from: http://arphotonics.net/ARP_Dendrimer_Terahertz_Spectrometer_LifeSciencesApplications.pdf.
Rouhi, et al., "High Frequency Sheet Conductance of Few-Layer Graphene", "Downloaded from: http://www.cecs.wright.edu/sites/cecs.wright.edu.research.thz/files/pubs/IEEE_Nano_2011_on_Graphene-Abstract-V6.pdf", 2011, pp. 1-2.
Sherwin, et al., "Opportunities in THz Science", "DOE-NSF-NIH Workshop on Opportunities in THz Science, Feb. 12-14, 2004", Feb. 12-14, 2004, pp. 1-124, Publisher: Downloaded from: http://www.osti.gov/bridge/servlets/purl/899222-MObyal/899222.pdf.
Williams, Benjamin S., "Terahertz Quantum-Cascade Lasers", "Nature Photonics", Sep. 2007, pp. 517-525, vol. 1, Publisher: Nature Publishing Group.
Yeh, et al., "Low-Loss Terahertz Ribbon Waveguides", "Applied Optics", Oct. 1, 2005, pp. 5937-5946, vol. 44, No. 28.

\* cited by examiner

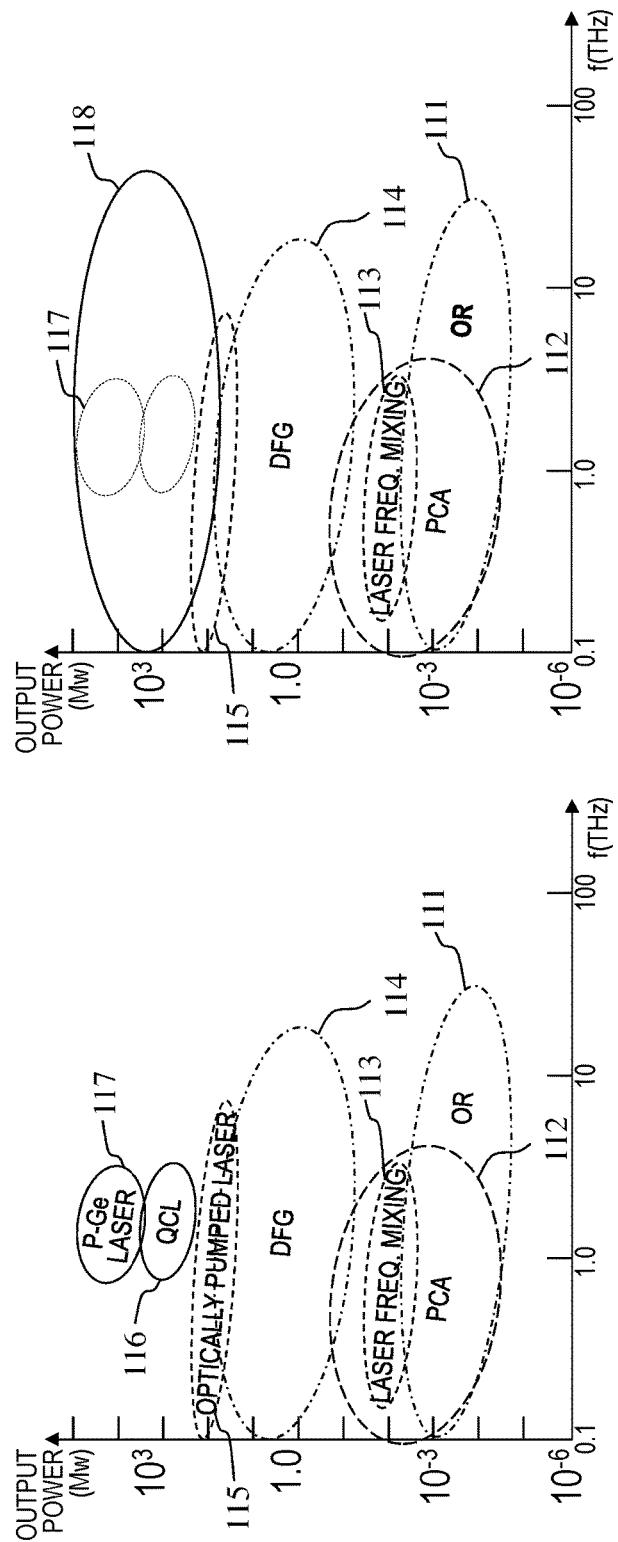

SYSTEM FOR GIGAHERTZ TO TERAHERTZ FREQUENCY SIGNAL GENERATION USING OPO AND DFG

CROSS-REFERENCE TO RELATED APPLICATIONS

This application is a divisional of U.S. patent application Ser. No. 14/740,257 filed on Jun. 16, 2015 by Yongdan Hu et al., titled "GIGAHERTZ TO TERAHERTZ FREQUENCY SIGNAL GENERATION USING OPO AND DFG" (to issue as U.S. Pat. No. 9,588,398 on Mar. 7, 2017), which is a divisional of U.S. patent application Ser. No. 13/828,875 filed on Mar. 14, 2013 by Yongdan Hu et al., titled "HIGH-POWER MULTI-FUNCTION MILLIMETER-WAVE SIGNAL GENERATION USING OPO AND DFG" (which issued as U.S. Pat. No. 9,057,927 on Jun. 16, 2015), which claims priority benefit under 35 U.S.C. § 119(e) of U.S. Provisional Patent Application No. 61/694,763 filed Aug. 29, 2012 by Yongdan Hu et al., titled "HIGH-POWER MULTI-FUNCTION MILLIMETER-WAVE SIGNAL GENERATION USING OPO AND DFG," each of which is incorporated herein by reference in its entirety.

This invention is related to:

U.S. Pat. No. 7,620,077 to Angus J. Henderson, which issued on Nov. 17, 2009, titled "Apparatus and method for pumping and operating optical parametric oscillators using DFB fiber lasers," and which claimed priority to U.S. Provisional Patent Application No. 60/697,787 filed Jul. 8, 2005, U.S. Pat. No. 6,940,877 to Yongdan Hu, et al., which issued on Sep. 6, 2005, titled "High-power narrow-linewidth single-frequency laser," each of which is incorporated herein by reference in its entirety.

FIELD OF THE INVENTION

The invention relates generally to terahertz and gigahertz sources of electromagnetic radiation, and more particularly to apparatus and methods for generating of two intermediate-frequency light beams from a single laser input using an optical-parametric oscillator having a piece of non-linear conversion material (e.g., a periodically poled lithium niobate (PPLN) crystal or other suitable material), and then obtaining a terahertz or gigahertz signal from the two intermediate-frequency light beams using a non-linear optical difference-frequency generator, which, in some embodiments, uses the same piece of non-linear conversion material as the OPO; or in other embodiments, uses a separate DFG piece of non-linear conversion material in the same cavity as the piece of non-linear conversion material used for the OPO.

BACKGROUND OF THE INVENTION

At present, there are no millimeter-wavelength (terahertz-frequency (THz)) sources that are compact, light-weight, narrow-linewidth, tunable, and high-power sources. Referred to hereafter as THz sources, these sources output electromagnetic radiation at a frequency in the range of at least about 0.1-10 THz.

Conventional sources in the terahertz (THz) range (i.e., 0.1-10 THz) have either too-low power or are only available in limited wavelengths and frequency bands. FIG. 1A shows the power- and frequency-capability characteristics of various conventional THz sources. 1—PCA (photoconductive antenna; e.g., interdigitated PCA); 2—OR (optical rectification); 3—$CO_2$ laser frequency mixing; 4—DFG (difference frequency generation); 5—optically pumped laser; 6—QCL (quantum-cascade laser); 7—p-Ge-laser.

Overview of Existing solutions—Existing solutions have limited applications due to their corresponding significant issues:

PCA and OR: low power;

$CO_2$ laser frequency mixing: small spectra range/tunability and low efficiency;

Traditional DFG: relatively low power, low efficiency and complex;

Optically pumped laser: no tunability, gas laser—high maintenance and bulky;

QCL: narrow available spectra range, requires cryogenic cooling; and p-Ge-laser: narrow available spectra range, operational nightmare—requires a cooling Dewar, and high magnetic and pulsed electric fields.

U.S. Pat. No. 7,054,339 issued to Yongdan Hu et al. on May 30, 2006, titled "Fiber-laser-based Terahertz sources through difference frequency generation (DFG) by nonlinear optical (NLO) crystals," is incorporated herein by reference. In the U.S. Pat. No. 7,054,339, Yongdan Hu (one of the inventors of the present invention) and his co-inventors described a fiber-laser-based implementation of a terahertz source through difference frequency generation (DFG) by nonlinear optical (NLO) crystals is compact, tunable and scalable. A pair of fiber lasers (Q-switched, CW (continuous wave) or mode-locked) generate single-frequency outputs at frequencies $\omega 1$ and $\omega 2$. A fiber beam combiner combines the laser outputs and routes the combined output to a THz generator head where a nonlinear interaction process in the NLO crystal generates THz radiation.

U.S. Pat. No. 7,539,221 issued May 26, 2009 to Jiang, et al., titled "Fiber-laser-based gigahertz sources through difference frequency generation (DFG) by nonlinear optical (NLO) materials," is incorporated herein by reference. The U.S. Pat. No. 7,539,221 described a fiber-laser-based implementation of a gigahertz source through difference frequency generation (DFG) by nonlinear optical (NLO) materials is compact, tunable and scalable. A pair of pulsed fiber lasers, preferably single-frequency lasers, generate output pulses at frequencies $\omega 1$ and $\omega 2$ that overlap temporally. A beam combiner combines the laser outputs and routes the combined output to a GHz generator head where a nonlinear interaction process in the NLO material generates GHz radiation.

Optical parametric oscillators (OPOs) provide an efficient way of converting short-wavelength electromagnetic radiation from coherent-light sources to long wavelengths, while also adding the capability to broadly tune the output wavelength. In general, an OPO system principally includes a short-wavelength laser source and an optical resonator (resonant optical cavity) containing a nonlinear crystal. In some embodiments, additional components include mode-matching optics and an optical isolator.

In general, the OPO operates with three overlapping light beams—an input pump beam having the shortest wavelength, and thus highest frequency (typically, this is coherent light from a laser), and two longer-wavelength, lower-frequency beams generated in the OPO called the signal beam (this is usually called the "OPO-signal" beam herein to distinguish from other signals) and the idler beam (this is usually called the "OPO-idler" beam herein). By convention, the shorter-wavelength beam is called the OPO-signal beam, and the longer-wavelength beam is called the OPO-idler beam. The energy of photons in the pump beam (proportional to 1/wavelength) will equal the sum of the energy of photons in the OPO-signal beam plus the energy of photons in the OPO-idler beam. The pump beam (i.e., excitation light from the short-wavelength laser source) is focused, using the mode-matching optics, through the optical isolator and into the resonant optical cavity, passing through the nonlinear crystal(s). Parametric fluorescence generated within the nonlinear material(s) is circulated within the resonant cavity and experiences optical gain. When the OPO is excited by a pump-power-per-unit-area above a certain threshold, oscillation occurs, and efficient conversion of pump photons to OPO-signal and OPO-idler photons occurs. Different configurations of OPOs are possible. Variables include the wavelengths that are resonant within the optical cavity (pump and/or OPO-signal and/or OPO-idler) and the type of resonator (ring versus linear). In a conventional OPO, depending on the application, either the OPO-signal beam or the OPO-idler beam, or both, will be the output light utilized by other components.

U.S. Pat. No. 7,620,077 issued Nov. 17, 2009 to Angus J. Henderson (one of the inventors of the present invention), titled "Apparatus and method for pumping and operating optical parametric oscillators using DFB fiber lasers," is incorporated herein by reference. In the U.S. Pat. No. 7,620,077, Henderson described an optical parametric oscillator (OPO) that efficiently converts a near-infrared laser beam to tunable mid-infrared wavelength output. In some embodiments, the OPO includes an optical resonator containing a nonlinear crystal, such as periodically-poled lithium niobate. The OPO is pumped by a continuous-wave fiber-laser source having a low-power oscillator and a high-power amplifier, or using just a power oscillator). The fiber oscillator produces a single-frequency output defined by a distributed-feedback (DFB) structure of the fiber. The DFB-fiber-laser output is amplified to a pump level consistent with exceeding an oscillation threshold in the OPO in which only one of two generated waves ("OPO-signal" and "OPO-idler") is resonant within the optical cavity. This pump source provides the capability to tune the DFB fiber laser by straining the fiber (using an attached piezoelectric element or by other means) that allows the OPO to be continuously tuned over substantial ranges, enabling rapid, wide continuous tuning of the OPO output frequency or frequencies.

U.S. Pat. No. 6,654,392 issued Nov. 25, 2003 to Arbore et al. entitled "Quasi-monolithic tunable optical resonator," which is hereby incorporated herein by reference, describes an optical resonator having a piezoelectric element attached to a quasi-monolithic structure that defines an optical path. Mirrors attached to the structure deflect light along the optical path. The piezoelectric element controllably strains the quasi-monolithic structure to change a length of the optical path by about 1 micron. A first feedback loop coupled to the piezoelectric element provides fine control over the cavity length. The resonator may include a thermally actuated spacer attached to the cavity and a mirror attached to the spacer. The thermally actuated spacer adjusts the cavity length by up to about 20 microns.

A monolithic resonator typically includes a single block of transparent material having reflecting facets that serve as the mirrors. Usually, the material is strained by changing its temperature. U.S. Pat. No. 4,829,532 issued May 9, 1989 to Kane, which is hereby incorporated herein by reference, describes an alternative where the optical path length of a monolithic oscillator can be adjusted by a piezoelectric element mounted to uniformly strain the entire block in a plane parallel to the plane of the optical path.

U.S. Pat. No. 8,035,083 issued Oct. 11, 2011 to Kozlov et al., titled "Terahertz tunable sources, spectrometers, and imaging systems," is incorporated herein by reference. Kozlov et al. describe a source of terahertz radiation at a fundamental terahertz frequency that is tunable over a fundamental terahertz-frequency range, and is coupled into a first waveguide. The first waveguide supports only a single transverse spatial mode within the fundamental terahertz frequency range. A solid-state frequency multiplier receives from the first waveguide the terahertz radiation and produces terahertz radiation at a harmonic terahertz frequency. A second waveguide receives the harmonic terahertz radiation. The tunable terahertz source can include a backward-wave oscillator with output tunable over about 0.10-0.18 THz, 0.18-0.26 THz, or 0.2-0.37 THz. The frequency multiplier can include at least one varistor or Schottky diode, and can include a doubler, tripler, pair of doublers, doubler and tripler, or pair of triplers. The terahertz source can be incorporated into a terahertz spectrometer or a terahertz imaging system.

U.S. Pat. No. 7,421,171 issued Sep. 2, 2008 to Ibanescu et al., titled "Efficient terahertz sources by optical rectification in photonic crystals and meta-materials exploiting tailored transverse dispersion relations," is incorporated herein by reference. Ibanescu et al. describe generating terahertz (THz) radiation. Their system includes a photonic-crystal structure including at least one nonlinear material that enables optical rectification. The photonic-crystal structure is configured to have the suitable transverse dispersion relations and enhanced density photonic states so as to allow THz radiation to be emitted efficiently when an optical or near-infrared pulse travels through the nonlinear part of the photonic crystal.

U.S. Pat. No. 7,473,898 issued Jan. 6, 2009 to Holly et al., titled "Cryogenic terahertz spectroscopy," is incorporated herein by reference. Holly et al. describe a terahertz spectroscopy system that includes a source of terahertz radiation, a detector of terahertz radiation, a source of sample gas, and a sample cell that can be cooled to cryogenic temperatures. The sample cell may be configured to receive the sample gas, received terahertz radiation from the source of terahertz radiation, provide the terahertz radiation to the detector after the terahertz radiation has passed through the sample gas, and facilitate cryogenic cooling thereof. The sample cell may be cryogenically cooled to freeze the sample gas and subsequently warmed either continuously or in steps in temperature so that individual components or groups of components of the sample gas may evaporate and thus have absorption spectra formed therefor.

U.S. Patent Application Publication US 2005/0018298 of Trotz et al., published Jan. 27, 2005 and titled "Method and apparatus for generating terahertz radiation," is incorporated herein by reference. Trotz et al. describe generating terahertz radiation. Their terahertz source is described as a versatile terahertz device that can be configured to transmit a plurality of wavelengths, thereby facilitating the detection of multiple contaminants using a single source device. In one embodiment, the Smith-Purcell radiation effect is exploited by passing an electron beam over a modulated conducting surface, wherein the spacing of the periods of the modulated surface is varied. The variations in the modulated surface enable the source to produce light of varying wavelengths.

U.S. Pat. No. 7,781,737 issued Aug. 24, 2010 to Zhdaneev, titled "Apparatus and methods for oil-water-gas analysis using terahertz radiation," is incorporated herein by reference. Zhdaneev describes analyzing gas-oil-water compounds in oilfield and other applications using terahertz radiation. A sample analyzer includes a sample chamber having a fluid communication port configured to receive the sample. The analyzer also includes a filter to filter samples and selectively remove oil, water or gas from reservoir mixture received by the sample chamber. A terahertz (THz) radiation detector is provided in electromagnetic communication with the sample. The terahertz detector provides a detected output signal indicative of the terahertz electromagnetic radiation detected from the sample. In some embodiments, the device also includes a terahertz source illuminating the sample, the terahertz detector detecting a portion of the terahertz source illumination as modified by the sample. The detected portion of the spectrum of terahertz radiation can be processed to analyze the composition of the sample.

U.S. Pat. No. 7,995,628 issued Aug. 9, 2011 to Wu, titled "Recycling pump-beam method and system for a high-power terahertz parametric source," is incorporated herein by reference. Wu describes the fabrication of a portable high-power terahertz beam source that can produce what Wu calls a tunable, high-power terahertz beam over the frequency from 0.1 THz to 2.5 THz. Wu's terahertz source employs a recycling pump beam method and a beam quality-control device. The beam quality-control device may or may not be required for a high-power terahertz beam generation. In exemplary embodiments, a lithium niobate ($LiNbO_3$) crystal or a lithium niobate crystal doped with 5% magnesium oxide ($LiNbO_3$:MgO) can be used. Other nonlinear optical crystals, including GaSe can be used in place of the $LiNbO_3$ crystal. Through proper alignment of a pump beam, along with recycling a pump beam, high conversion efficiency is achieved, and a high output power beam is produced at terahertz frequencies.

U.S. Pat. No. 7,391,561 titled "Fiber- or rod-based optical source featuring a large-core, rare-earth-doped photonic-crystal device for generation of high-power pulsed radiation and method," which issued to Di Teodoro, et al. on Jun. 24, 2008, is incorporated herein by reference. Di Teodoro, et al. describe a photonic-crystal fiber having a very large core while maintaining a single transverse mode. The typical problems of multiple-modes and mode hopping, which result from the use of large-diameter waveguides, are addressed by the invention. By using multiple small waveguides in parallel, large amounts of energy can be passed through a laser, but with better control such that the aforementioned problems can be reduced. An additional advantage is that the polarization of the light can be better maintained as compared to using a single fiber core.

There is still a heretofore unmet need in the art for an improved method and apparatus for high-power fiber-laser-based gigahertz-to-terahertz, millimeter-wave, signal sources for advanced sensors, photonics, and optical computing.

BRIEF SUMMARY OF THE INVENTION

Terahertz technology is a very promising technology for both defense and commercial applications. In some embodiments, the present invention provides a high-power fiber-laser-based gigahertz-to-terahertz, millimeter-wave, signal-generation apparatus that provides key wanted features in a compact and light-weight package. In some embodiments, the present invention offers at least ten times the output power as previous conventional sources, while having multiple functions incorporated in one system.

In some embodiments, the present invention uses a high-power infrared (IR) laser (e.g., an IR fiber laser provides an advantageous solutions in some environments) as a source of pump-laser energy to pump a tunable optical parametric oscillator (OPO) crystal plus a difference-frequency-generation (DFG) crystal to generate narrow-linewidth, tunable and high-power signals in the GHz to THz range a compact and light-weight package while having an option to use residual high-power IR laser beam (i.e., the pump, OPO-idler and/or OPO-signal wavelengths) for other useful applications in the same instrument. In some embodiments, a single crystal is used for both the OPO and the DFG. The OPO function is used to receive a pump frequency and use that energy to generate an OPO-idler frequency and an OPO-signal frequency that differ from one another by the desired THz or GHz frequency that is to be output. For example, in some embodiments, an infrared (IR) pump wavelength of 1060 nm has a frequency of 283.0188679 THz, and is used to generate OPO-signal and OPO-idler wavelengths of, e.g., about 2112.5357072 nm and about 2127.517228 nm (corresponding to OPO-signal and OPO-idler frequencies of about 142.009434 THz and about 141.009434 THz), which are then used as electromagnetic-radiation inputs to a DFG that outputs the frequency difference of about 1.00000002 THz.

In some embodiments, the OPO and the DFG are located in the same cavity, in some embodiments, the OPO and the DFG are implemented using the same type of non-linear optical crystal, and in some embodiments, the OPO and the DFG are implemented using the same non-linear optical crystal.

Some embodiments provide an apparatus and a related method for high-power multi-function millimeter-wavelength (THz-frequency) signal generation using an OPO and a DFG in a single cavity. In some embodiments, the OPO-DFG cavity includes an optical parametric oscillator (OPO) non-linear material that receives pump light $I_P$ having pump-light frequency and generates two lower intermediate frequencies of light—an OPO-signal beam $I_S$ and a spatially overlapping OPO-idler beam $I_I$. A difference-frequency generator non-linear material then receives the two intermediate-frequency beams $I_I$ and $I_S$, and the DFG then generates a THz-frequency output signal that has a frequency equal to the difference between the two intermediate frequencies. In some embodiments, a single-piece crystal of non-linear material is used for both OPO and DFG functions. Some embodiments use a bow-tie ring having four mirrors that define four corners of the bow-tie-shaped optical path: a frequency-selective $I_P$-beam-entry mirror (in some embodiments, this first mirror is highly transmissive to $I_P$ and highly reflective to $I_S$ and/or $I_I$), a frequency-selective $I_P$-light-extraction mirror (in some embodiments, this second mirror is highly transmissive to $I_P$ and highly reflective to $I_S$ and/or $I_I$) to remove unconverted $I_P$-beam, a frequency-selective or partially transmissive $I_I$-beam-extraction mirror (in some embodiments, this third mirror is partially transmissive to $I_I$ and highly reflective to $I_S$), and a frequency-selective or partially transmissive $I_S$-beam-extraction mirror (in some embodiments, this fourth mirror is partially transmissive and partially reflective to $I_S$), and optionally a fifth $I_{THz}$-beam-extraction mirror within the bow-tie optical path. Alternatively, the $I_P$-light-extraction mirror is highly transmissive to both $I_{THz}$ and $I_P$, and is used to extract both the unconverted $I_P$ light and the $I_{THz}$ output beam, which are then separated by a beam-separation mirror external to the bow-tie path. Other embodiments use two diffraction gratings to split and recombine the two intermediate frequencies (or to select one of the intermediate-frequency beams (either the OPO-signal beam $I_S$ or the OPO-idler beam $I_I$) as the fixed-intermediatefrequency circulating beam and to dump the other one of the intermediate-frequency beams, and two corner mirrors, which together define the bow-tie optical path.

Other embodiments use two diffraction gratings, one used to split the two intermediate frequencies into separate beams, and the other grating used to recombine the two intermediate-frequency beams, and two (or more, if separate mirrors are used for the two beams) corner mirrors. In some such embodiments, one or more etalons are used to frequency-filter each of the two intermediate-frequency beams independently to their respective frequencies, and two cylindrical mirrors are used to re-converge each of the two separated beams toward the second diffraction grating. In some such embodiments, a different piezo-electric actuator is attached to each of the two mirrors that are used to re-converge each of the two separated beams toward the second diffraction grating, wherein the two piezo-electric actuators allow independent adjustment of the lengths of the cavity as seen by each intermediate beam, for tuning purposes.

One advantage of this solution is that it provides a light-weight system that outputs a tunable, high-power, THz and/or GHz signal that, in some embodiments, has a narrow linewidth.

BRIEF DESCRIPTION OF THE FIGURES

Each of the items shown in the following brief description of the drawings represents some embodiments of the present invention.

FIG. 1A is a graphical representation of the power ranges (vertical axis) and frequency ranges (horizontal axis) available from each of a plurality of conventional THz sources.

FIG. 1B is a graphical representation of the power range (vertical axis) and frequency range (horizontal axis) available from embodiments of the present invention, as compared to each of a plurality of conventional THz sources as shown in FIG. 1A.

DETAILED DESCRIPTION OF THE INVENTION

Figure 1C:
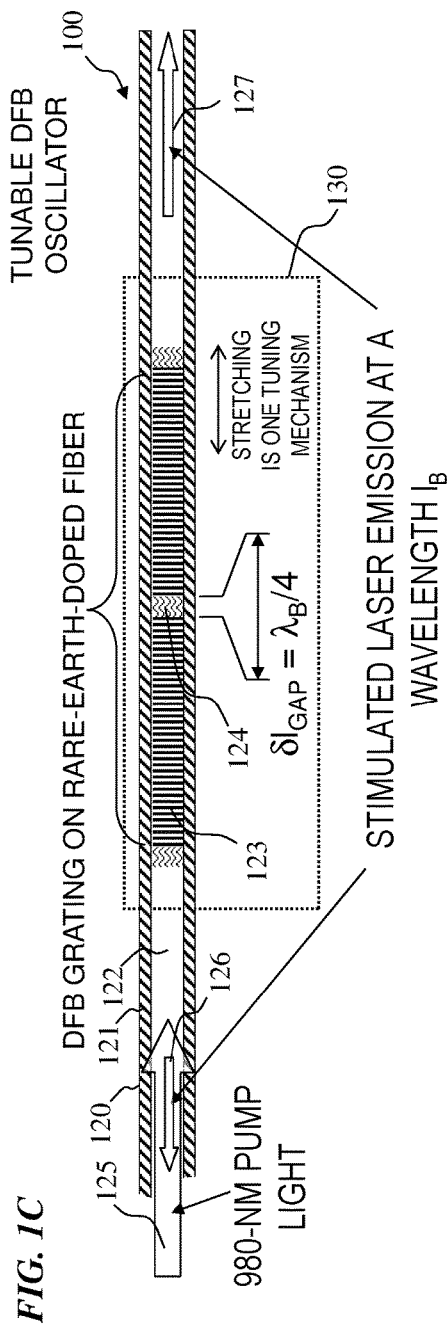
FIG. 1C is a block diagram of a distributed-feedback fiber laser 100 having a tuning mechanism.

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

FIG. 1A is a graphical representation of the approximate power ranges (vertical axis) and frequency ranges (horizontal axis) available from each of a plurality of conventional THz sources. Conventional OR THz sources (with power/frequency ranges of oval 111) appear to have a power range of approximately $5 \times 10^{-8}$ watts ($5 \times 10^{-5}$ mW) to approximately $1 \times 10^{-5}$ watts ($1 \times 10^{-2}$ mW), and a frequency range of approximately 100 GHz (0.1 THz) to approximately 30 THz. Conventional PCA THz sources (with power/frequency ranges of oval 112) appear to have a power range of approximately $5 \times 10^{-8}$ watts ($5 \times 10^{-5}$ mW) to approximately $2 \times 10^{-4}$ watts ($2 \times 10^{-1}$ mW), and a frequency range of approximately 100 GHz (0.1 THz) to approximately 5 THz. Conventional $CO_2$-based laser-frequency-mixing THz sources (with power/frequency ranges of oval 113) appear to have a power range of approximately $5 \times 10^{-6}$ watts ($5 \times 10^{-3}$ mW) to approximately $5 \times 10^{-4}$ watts ($2 \times 10^{-1}$ mW) and a frequency range of approximately 100 GHz (0.1 THz) to approximately 50 THz, and a frequency range of approximately 200 GHz (0.2 THz) to approximately 5 THz. Conventional traditional DFG THz sources (with power/frequency ranges of oval 114) appear to have a power range of approximately $1 \times 10^{-4}$ watts (0.1 mW) to approximately 0.1 watts (100 mW), and a frequency range of approximately 200 GHz (0.2 THz) to approximately 5 THz. Conventional optically pumped laser THz sources (with power/frequency ranges of oval 115) appear to have a power range of approximately $5 \times 10^{-2}$ watts (50 mW) to approximately 0.5 watts (500 mW), and a frequency range of approximately 100 GHz (0.1 THz) to approximately 5 THz. Conventional quantum-cascade-laser THz sources (with power/frequency ranges of oval 116) appear to have a power range of approximately 0.5 watts (500 mW) to approximately 5 watts (5,000 mW), and a frequency range of approximately 800 GHz (0.8 THz) to approximately 2 THz. Conventional p-Ge-laser THz sources (with power/frequency ranges of oval 117) appear to have a power range of approximately 5 watts to approximately 100 W, and a frequency range of approximately 800 GHz (0.8 THz) to approximately 2 THz.

FIG. 1B is a graphical representation of the power range (vertical axis) and frequency range (horizontal axis) available from embodiments of the present invention, as compared to each of a plurality of conventional THz sources as shown in FIG. 1A. In some embodiments, the OPO-DFG THz sources (with power/frequency ranges of oval 118) typically have a power range of approximately 0.01 watts to 100 W or more, and a frequency range of 30 GHz (0.03 THz) or less, to 50 THz or more.

In some embodiments, the present invention uses a high-power infrared (IR) laser—in some embodiments, a fiber laser—to pump a unit including tunable OPO plus DFG (difference-frequency-generation) crystals to generate narrow-linewidth, tunable and high-power THz sources in a compact and light-weight package, while having an option to use residual high-power IR laser beam for other useful applications.

FIG. 1C is a block diagram of a distributed-feedback fiber laser 100 having a tuning mechanism, which, in some embodiments, is used as the pump source or as the master-oscillator seed pump signal to a power amplified (MOPA) pump-light source for the present invention. In some embodiments, the present invention provides an optical-parametric-oscillator difference-frequency-generator (OPO-DFG) THz source having continuous tuning that is enabled by using a distributed-feedback fiber laser 100 such as shown in FIG. 1C (and described in U.S. Pat. No. 7,620,077 titled "Apparatus and method for pumping and operating optical parametric oscillators using DFB fiber lasers," which is incorporated herein by reference in its entirety) as its pump source. One embodiment of such a distributed-feedback fiber laser 100 includes an optical fiber 120 having a core 122 and one or more cladding layers 121. In some embodiments, a portion of fiber 120 includes a distributed-feedback grating 123 having a gap 124 that has a length $\delta 1_{GAP} = \lambda_B/4$, or $\lambda_B(N+0.25)$ where N is an integer. In some embodiments, a tuning mechanism (such as, for example, a PZT (piezo-electric element) and/or a heating element used to stretch the length of grating 123 and/or gap 124) is used to change the wavelength of the laser light output of DFB fiber laser pump source 100. In some embodiments, DFB-pump light 125 of a suitable wavelength (e.g., in some embodiments, 980 nm wavelength is used for the optical excitation 125 to pump the DFB laser 100) is input to the DFB laser, and laser light 126 and 127 is output having a wavelength useful for pumping any of the OPO-DFG devices described below. In some embodiments, pump laser 100 is used for master oscillator 211 described below.

Figure 2:
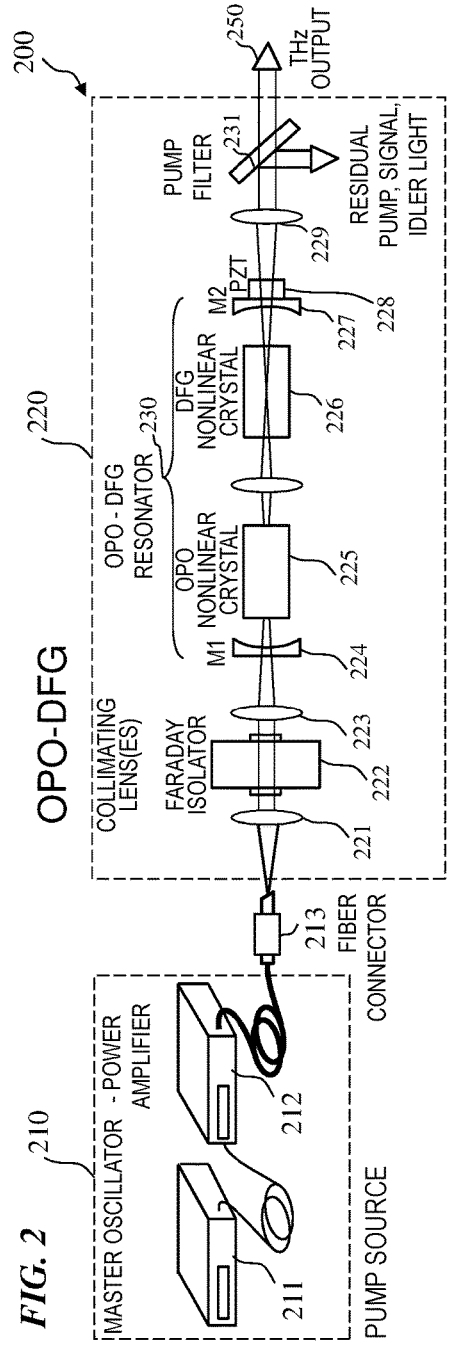
FIG. 2 is a block diagram of a system 200 having a two-mirror combined OPO and DFG pumped by a fiber laser.

FIG. 2 is a block diagram of a system 200 having a two-mirror combined OPO and DFG pumped by a fiber laser. In some embodiments, system 200 includes a pump laser 210 and an OPO-DFG 220. In some embodiments, pump laser 210 includes a master oscillator 211 (e.g., a DFB tunable fiber laser such as described above in FIG. 1C, in some embodiments) and an optical power amplifier 212. In other embodiments, only a power master oscillator 211 (e.g., a powerful DFB tunable fiber laser) is used, when that provides sufficient laser pump light power by itself. In some embodiments, fiber connector 213 connects pump laser 210 to OPO-DFG 220. In some embodiments, OPO-DFG 220 includes a first collimating lens 221, a Faraday isolator 222, and a second collimating lens 223 that together condition the pump light for injection into OPO-DFG resonator 230, which, in some embodiments, is tuned (e.g., by PZT 227 moving mirror 226 to adjust the length of the OPO-DFG cavity between input mirror 224 and output mirror 226) to resonate at the OPO-signal wavelength (and/or (in some embodiments) at the OPO-idler wavelength and/or (in some embodiments) at the pump wavelength). In some embodiments, the OPO-signal frequency is kept at a fixed frequency, such that as the pump wavelength is changed, the OPO-idler frequency is also changed in order to tune the frequency of the THz output signal, such that the DFG non-linear crystal generates a THz signal having a frequency equal to the difference between the OPO-signal frequency and the OPO-idler frequency. In some embodiments, a non-linear crystal 225 (such as, e.g., periodically poled lithium niobate (PPLN)) is used to convert the pump-wavelength light (having the shortest wavelength) into OPO-signal-wavelength light (having a wavelength between that of the pump wavelength and that of the OPO-idler wavelength) and OPO-idler-wavelength light (having the longest wavelength). In some embodiments, M2 mirror 227 is wavelength-selective such that it passes the THz output signal and perhaps some pump, OPO-signal and/or OPO-idler light. In some embodiments, lens 229 collimates, and wavelength-selective mirror 231 removes, the pump light (directed downward) and they pass THz output signal 250 as output to the right. The OPO-DFG resonator cavity 230 is generally desired to resonate at only a single wavelength (e.g., the OPO-signal wavelength if OPO-idler-wavelength light is the tunable variable-wavelength input to the DFG 226 (for example, the longer wavelength is the tunable wavelength that is input to the DFG 226), or the OPO-idler wavelength if OPO-signal-wavelength light is the variable-wavelength input to the DFG 226 (for example, the shorter wavelength is the tunable wavelength that is input to the DFG 226)). In some embodiments, mirror 227 (which, in some embodiments, is adjusted using piezo element 228 to tune the fixed resonant wavelength (either OPO-signal or OPO-idler wavelength)) is made substantially transparent or non-reflective at the pump wavelength and at the wavelength of the variable-wavelength input to the DFG 226, in order that those wavelengths do not become resonant in the cavity (in some embodiments, if two or more wavelengths (of the pump, OPO-signal, and OPO-idler wavelengths) become resonant, then wavelength and/or amplitude instabilities ensue since power may shift between the resonant wavelengths). To avoid such instabilities, some (or most) embodiments of the present invention are designed to resonate at a single wavelength (of the pump, OPO-signal, and OPO-idler wavelengths), and some or all of the mirrors are designed to transmit other wavelengths that may arise.

Figure 3A:
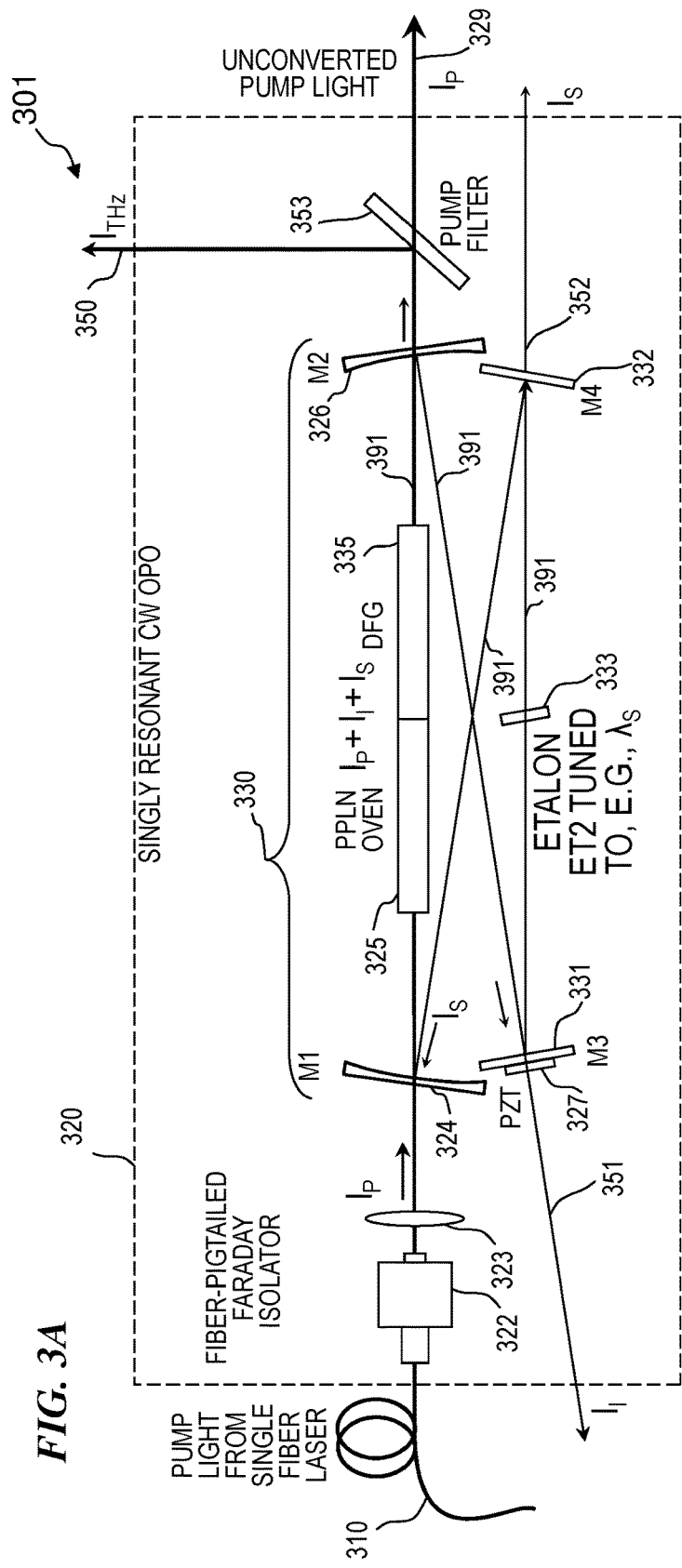
FIG. 3A is a block diagram of an alternative four-mirror bow-tie combined OPO and DFG cavity device 301.

FIG. 3A is a block diagram of an alternative four-mirror bow-tie combined OPO and DFG cavity device 301. In some embodiments, OPO-DFG 320 accepts input pump light from fiber 310 (in some embodiments, coming from a tunable DFB fiber laser, not shown), and includes a fiber-pigtail-input Faraday isolator 322, and a collimating lens 323 that together condition the pump light for injection into OPO-DFG resonator 330, which, in some embodiments, is tuned (e.g., by PZT 327 moving mirror 331 to adjust the length of the OPO cavity between input mirror 324 and itself (i.e., the path that returns to mirror 324) by way of output mirror 326, movable mirror 331, and mirror 332) to resonate at the OPO-signal wavelength (and/or the OPO-idler wavelength and/or the pump wavelength). In some embodiments, moving mirror 331 is highly reflective at the frequency of OPO-signal $I_S$, and transmissive at the frequency of OPO-idler $I_I$, such that OPO-idler $I_I$ leaves the bow-tie ring 391 as $I_I$ output beam 351. In some embodiments, an etalon 333 that passes just the OPO-signal wavelength is also used (in addition to movable mirror 331), or alternatively used, to tune the resonant OPO-signal wavelength $\lambda s$ to match the path length of bow-tie ring 391. In some embodiments, mirror 332 is partially reflective and partially transmissive at the frequency of OPO-signal $I_S$, such that some of OPO-signal $I_S$ leaves the bow-tie ring 391 as $I_S$ output beam 352. In some embodiments, the OPO-signal frequency (of light $I_S$) is kept at a fixed frequency, such that as the pump frequency of pump light $I_P$ is changed, the OPO-idler frequency (of light $I_I$) is also changed, and thus the THz output-signal frequency is changed by the same amount. In other embodiments, a fixed-frequency pump light $I_P$ is used, a fixed-frequency light $I_I$ is used, a fixed-frequency light $I_S$ is used, and a fixed-frequency THz output signal is generated.

In some embodiments, a non-linear crystal 325 (such as, e.g., PPLN) is used to convert the pump-wavelength light $I_P$ (the photons having the highest frequency) into OPO-signal-wavelength light $I_S$ (photons having a frequency between the pump frequency and the OPO-idler frequency, which enter the DFG crystal 335) and OPO-idler-wavelength light $I_I$ (photons having the lowest intermediate frequency entering the DFG crystal 335). In some embodiments, non-linear crystal 325 and/or non-linear crystal 335 are/is heated and kept at a constant temperature in an oven. In some embodiments, non-linear crystal 325 is touching (as shown in FIG. 3A) or closely adjacent to non-linear crystal 335, while in other embodiments (not shown here), there is a spatial separation between non-linear crystal 325 and non-linear crystal 335. In some other embodiments, the cavity 330 is made to be resonant at the OPO-idler frequency, and in this case, the OPO-signal frequency (i.e., a frequency higher than the OPO-idler frequency) is the variable-frequency and/or non-resonant light entering DFG 335 to produce the THz output signal electromagnetic radiation 350. In some embodiments, M2 mirror 326 is wavelength-selective such that it reflects some or all of the resonant and/or non-resonant intermediate-frequency light (i.e., the OPO-idler light $I_I$ and/or OPO-signal light $I_S$, as the case may be, is reflected (directed leftward and slightly downward)) and but passes the unconverted pump light and the THz output signal $I_{THz}$. In some embodiments, wavelength-selective mirror 353 passes the pump light $I_P$ 329 and any leaked OPO-idler light $I_I$ and/or OPO-signal light $I_S$ (directed rightward), but reflects THz output-signal electromagnetic radiation $I_{THz}$ 350 as output (upward in FIG. 3A). In some other embodiments (not shown here), wavelength-selective mirror 353 reflects the pump light $I_P$, and any leaked OPO-idler light $I_I$ and/or OPO-signal light $I_S$ (directed upward) and passes THz output-signal electromagnetic radiation $I_{THz}$ 350 as output (which would be rightward if depicted in FIG. 3A).

In some embodiments, non-linear crystal 325 and/or non-linear crystal 335 have/has periodically alternating ferroelectric domain structures that vary in period (the poling period) across the width of the crystal (such crystals are called periodically poled; e.g., PPLN is periodically poled lithium niobate). In some embodiments, the sideways positioning of non-linear crystal 325 and/or non-linear crystal 335 can be varied, in order to vary the poling period encountered by the light propagating through the crystal(s). The OPO-DFG resonator 320 includes the bow-tie ring path 391 (i.e., the bow-tie ring 391 being the optical path from mirror 324, through OPO 325 and DFG 335 to mirror 326, then to mirror 331, then through etalon 333 to mirror 332, and finally back to mirror 324), configured to avoid unwanted double or triple resonances by circulating only one of the two intermediate-frequency beams (e.g., OPO-signal light $I_S$) and to maintain a sufficient amount of pump light $I_P$ and a sufficient amount of OPO-signal light $I_S$ such that OPO 325 is above threshold in order to generate the OPO-idler light $I_I$, such that amounts of the OPO-signal light $I_S$ and OPO-idler light $I_I$ needed by DFG 335 to generate the THz output light are maintained. When OPO-signal light $I_S$ is the frequency that circulates around bow-tie ring path 391, the amount of OPO-signal light $I_S$ exceeds the amount of OPO-idler light $I_I$, since one photon of OPO-pump light $I_P$ and one photon of OPO-signal light $I_S$ will cause the loss of the one OPO-pump light $I_P$ photon and the emission of one photon of OPO-idler light $I_I$ and one photon of OPO-signal light $I_S$ in addition to the starting one photon of OPO-signal light $I_S$. In other embodiments, it is the OPO-idler light $I_I$ (the lower-frequency of the two intermediate beams) that is circulated around bow-tie ring path 391 (including through etalon 333), and the OPO-signal light $I_S$ is removed by mirror 331 and/or etalon 333.

Figure 3B:
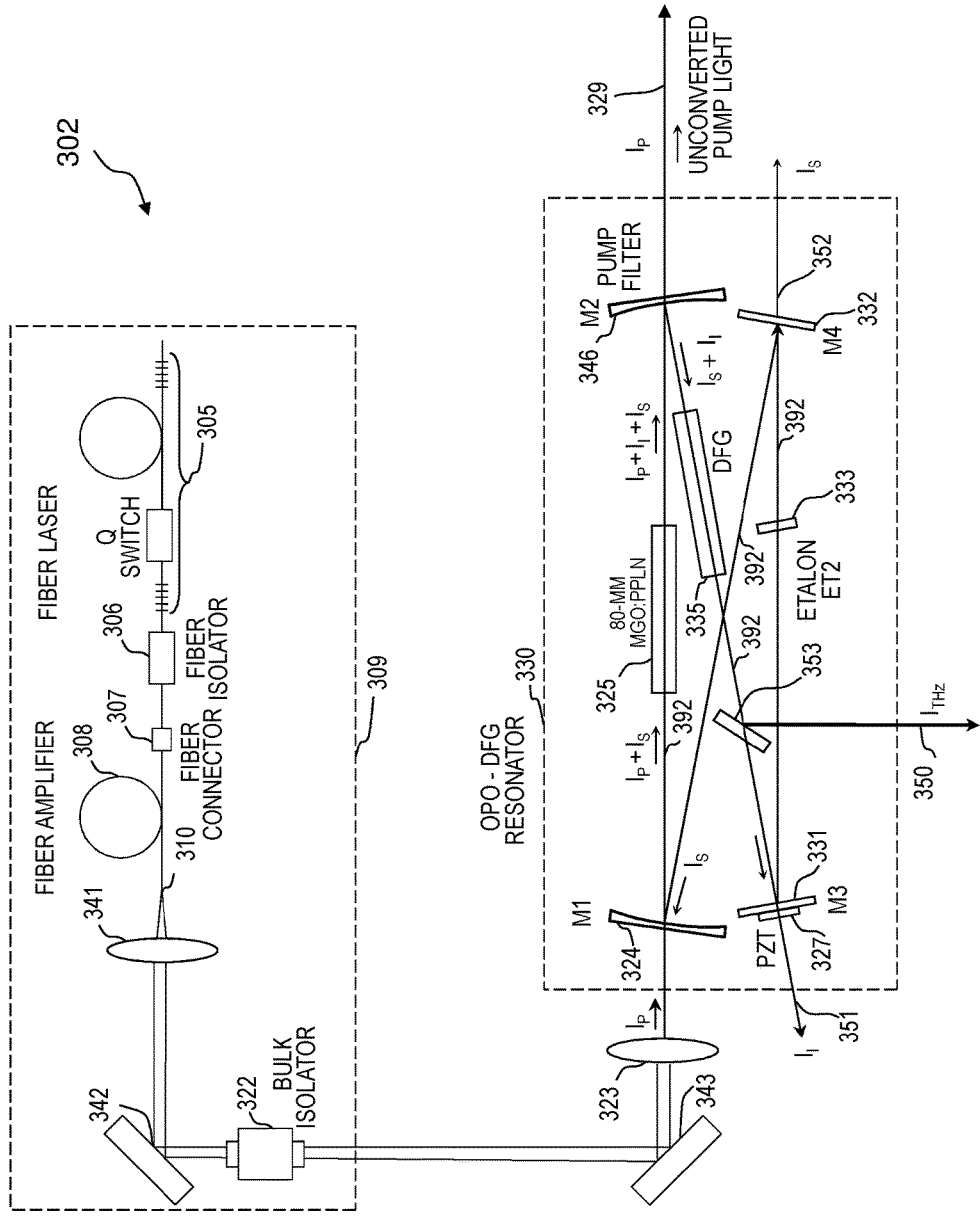
FIG. 3B is a block diagram of another four-mirror bow-tie combined OPO and DFG cavity device 302.

FIG. 3B is a block diagram of another four-mirror bow-tie combined OPO and DFG cavity device 302 having certain parts corresponding to those of FIG. 3A, and showing a MOPA with master-oscillator (the DFB fiber laser 305) and power-amplifier (the fiber amplifier 308) shown. In contrast to the device 301 embodiment shown in FIG. 3A, device 302 separates OPO crystal 325 from DFG crystal 335 so that each is in a separate respective leg of the bow-tie ring 392 (i.e., bow-tie ring 392 being the optical path from mirror 324, through OPO 325 to mirror 346, then through DFG 335 and mirror 353 to mirror 331, then through etalon 333 to mirror 332, and finally back to mirror 324), which allows removal of the pump light $I_P$ through wavelength-selective mirror 346 before the OPO-idler light $I_I$ and OPO-signal light $I_S$ enter the DFG crystal 335 to be converted to electromagnetic radiation of the THz output-signal frequency.

In some embodiments, fiber laser 309 (e.g., in some embodiments, seeded by a DFB fiber laser such as shown in FIG. 1C; or in other embodiments, seeded by a Q-switched fiber laser 305) is optically pumped from one or more laser diodes, is configured in a MOPA arrangement, which optionally uses one or more high-power photonic-crystal amplifiers as fiber amplifier 308 (e.g., shown here as a loop of fiber, but alternatively using a laser and/or power amplifier such as those described in commonly-assigned U.S. Pat. No. 7,391,561 titled "Fiber- or rod-based optical source featuring a large-core, rare-earth-doped photonic-crystal device for generation of high-power pulsed radiation and method," which is incorporated herein by reference). In some embodiments, laser 309 includes a fiber isolator 306, fiber connector 307 (to fiber amplifier 308) and output fiber 310 (the diode pump laser(s), not shown, is/are coupled using methods well known to the art, such as shown in U.S. Pat. No. 7,391,561).

In some embodiments, the output beam of pump laser 309 is collimated using lens 341, reflected by mirror 342, passed through one-way bulk isolator 322, and reflected by mirror 343 through focusing lens 323 that acts to focus (taking into account the focusing effects of mirror 324) the pump beam at the center of the PPLN 325. Pump-extraction mirror 346 is transparent to the pump frequency (which is output through mirror 326) (in order to prevent a doubly or triply resonant cavity), while being highly reflective to light at the OPO-signal frequency and the OPO-idler frequency. The coincident beams $I_S$ and $I_I$ containing the intermediate OPO-signal frequency and the OPO-idler frequency are used by DFG 335 to generate the THz output that is reflected off frequency-selective mirror 353 to become THz output 350. In some embodiments, frequency-selective mirror 353 passes the unconverted portions of intermediate OPO-signal $I_S$ and OPO-idler $I_I$. In some embodiments, the mirror 331 is highly reflective at the resonant frequency (e.g., the OPO-signal frequency), and highly (or at least partially) transmissive at the non-resonant intermediate (e.g., OPO-idler) frequency, the etalon 333 is tuned to be transparent only at the resonant (e.g., OPO-signal) frequency (blocking or reflecting any of the other intermediate frequency that may have been reflected by mirror 331), and mirror 332 is highly reflective at the resonant (e.g., OPO-signal) frequency, such that only that frequency returns to input mirror 324. In some other embodiments, the mirror 331 need not be transmissive at the non-resonant intermediate (e.g., OPO-idler) frequency since that frequency should be blocked by etalon 333.

In some embodiments, as described further below, one or more of the mirrors 324, 326, 331, and/or 332 is partially transparent to the OPO-signal frequency and/or OPO-idler frequency (e.g., one- to five-percent transparent in total), in order to prevent excessive buildup of light at that/those frequency(ies) in the cavity, which would tend to overheat the crystal(s) 325 and/or 335. In some embodiments (as shown in FIG. 3B), the THz output signal 350 is extracted by reflection at frequency-selective mirror 353 within the bow-tie ring. In some other embodiments (not shown), mirror 353 is omitted and the THz output signal 350 is extracted by transmission through a THz-transmissive, $I_S$-reflective and/or $I_I$-reflective, frequency-selective mirror that replaces mirror 331. Thus, in some embodiments, the unconverted pump light $I_P$ is removed from the bow-tie ring of resonator 330 once it leaves OPO 325 and before the remaining OPO-signal light $I_S$ and OPO-idler light $I_I$ enter the DFG 335 (e.g., in the embodiment shown, unconverted pump light $I_P$ passes through frequency-selective mirror 346, while the remaining OPO-signal light $I_S$ and OPO-idler light $I_I$ are reflected toward DFG 335). Further, in some embodiments, the THz output electromagnetic radiation $I_{THz}$ is removed from the bow-tie ring of resonator 330 once it leaves DFG 335 and before the remaining OPO-signal light $I_S$ and OPO-idler light $I_I$ impinge on mirror 331 and/or etalon 333, which allows one of those to pass (e.g., in some embodiments, remaining OPO-signal light $I_S$), while the other OPO-idler light $I_I$ is blocked and/or removed from the bow-tie ring).

Figure 4A:
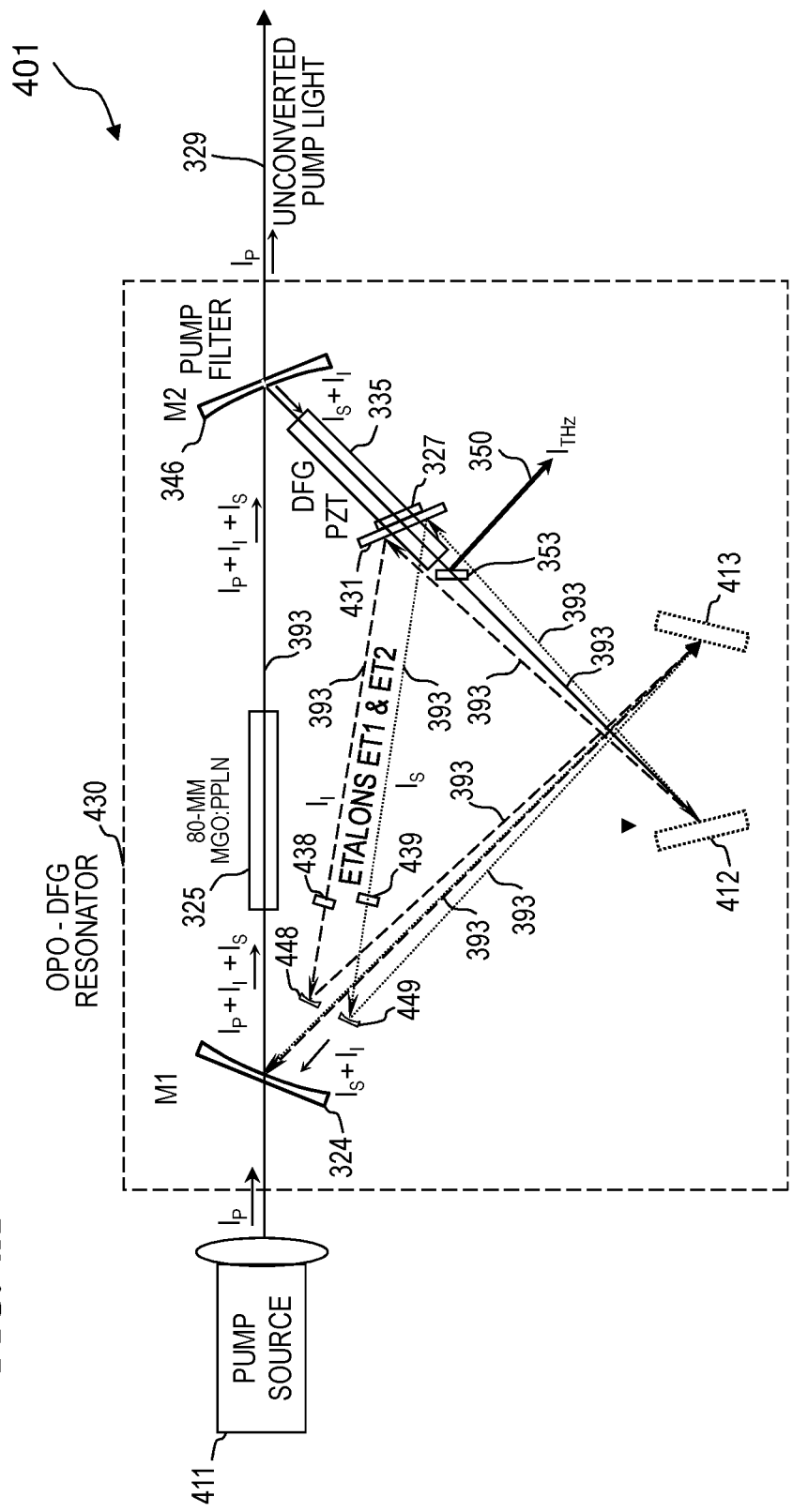
FIG. 4A is a block diagram of another four-mirror bow-tie combined OPO and DFG cavity device 401.

FIG. 4A is a block diagram of another four-mirror bow-tie combined OPO and DFG cavity device 401. In some embodiments, pump source 411 supplies pump light $I_P$ that passes through frequency-selective mirror 324 that is highly transmissive to the frequency of pump light $I_P$ and highly reflective to the frequency of at least one of the intermediate-frequency beams of light $I_S$ and/or $I_I$. In some embodiments, the pump light $I_P$ and OPO-signal light $I_S$ enter OPO crystal 325, and stimulate absorption of pump light $I_P$ and emission of OPO-idler light $I_I$ and additional OPO-signal light $I_S$ (denoted as $I_P+I_I+I_S$ propagating rightward in the FIG. 4A). In some embodiments, pump-extraction mirror 346 is highly transmissive to the frequency of pump light $I_P$, and highly reflective to the frequency of OPO-idler light $I_I$ and to the frequency OPO-signal light $I_S$ (denoted as $I_I+I_S$ propagating leftward and downward in FIG. 4A), that enter DFG crystal 335, which generates the difference-frequency signal $I_{THz}$ that is output, by reflection by frequency-selective mirror 353 (which transmits the frequency of OPO-idler light $I_I$ and to the frequency OPO-signal light $I_S$ but reflects THz signals), as THz output signal 350. The unconverted OPO-idler light $I_I$ and OPO-signal light $I_S$ are transmitted through frequency-selective mirror 353 and are diffracted back (upward and rightward) by beam-separating diffraction grating 412 (in some embodiments, the beam of unconverted OPO-idler light $I_I$ and OPO-signal light $I_S$ impinges on beam-separating diffraction grating 412 at or very near to the Littrow angle (wherein the outgoing OPO-idler light beam $I_I$ will diffract back to a small angle to one side of the incoming beam to grating 412, and the outgoing OPO-signal light beam $I_S$ will diffract back to a small angle to the opposite side of the incoming beam to grating 412) in order to obtain the most light in the two primary diffracted beams OPO-idler light $I_I$ and OPO-signal light $I_S$, which diffract back toward mirror 431 at slightly different angles due to their slightly different frequencies. In some embodiments, mirror 431 is again mounted to a piezo-electric (PZT) actuator 327 used to tune the resonant cavity length, but unlike mirror 331 of FIG. 3A, in some embodiments, mirror 431 is highly reflective to both $I_I$ and $I_S$. In some embodiments, an additional PZT actuator (not shown here) is coupled to one or the other of mirrors 448 or 449, so that PZT actuator 327 is used to tune the length of cavity for the intermediate-frequency beam that reflects from the fixed one of mirrors 448 or 449, and then the additional PZT actuator is used to move the other one of mirrors 448 or 449 to tune the length of the cavity seen by the other intermediate-frequency beam. Because of the angular separation (which is caused by beam-separating diffraction grating 412) between OPO-idler light $I_I$ and OPO-signal light $I_S$, separate etalons 439 and 438 are used to individually and independently tune the respective frequencies of OPO-idler light $I_I$ and OPO-signal light $I_S$ to obtain the desired output frequency of THz output signal 350. In some embodiments, cylindrical mirrors 449 and 448, respectively, are used to reverse the divergence of the separate beams of OPO-idler light $I_I$ and OPO-signal light $I_S$ (which divergence is caused by slightly different angles of diffraction for frequencies at opposite edges of the linewidth of each beam) in the plane of ring 393 and have them converge to beam-combining diffraction grating 413, which, in some embodiments, is also at a near-Littrow angle (wherein the incoming OPO-idler light beam $I_I$ will impinge at a small angle to one side of the outgoing beam from grating 413, and the incoming OPO-signal light beam $I_S$ will impinge at a small angle to the opposite side of the outgoing beam to grating 412, and both frequencies will thus recombine into a single collimated beam) to obtain maximum efficiency in diffracting and recombining the two separate beams of OPO-idler light $I_I$ and OPO-signal light $I_S$ into a single beam directed at mirror 324. In some embodiments, beam-combining diffraction grating 413 (which, by itself, cannot compensate for the spatial-divergence widening within each beam, and thus would produce a wider beam propagating toward OPO 325 than desired) and cylindrical mirrors 448 and 449 (which, by themselves, cannot compensate for the angular difference between the two beams, and thus could not produce a single collimated beam as desired) together provide the requisite compensation to both reverse the chromatic dispersion or divergence within each beam and the angular separation between OPO-idler light $I_I$ and OPO-signal light $I_S$, both of which were introduced by beam-separating diffraction grating 412 earlier in the ring.

In some such embodiments, one etalon is used to frequency-filter both of the two intermediate-frequency beams (because the two beams traverse the etalon at different angles, a single etalon (such as 537 of FIG. 5A) can be used to tune both of two different frequencies) or in other embodiments, one or more etalons 438 and 439 are used to frequency-filter each of the two intermediate-frequency beams independently to their respective frequencies, for tuning purposes. In some embodiments, two cylindrical mirrors 448 and 449 are used to re-converge each of the two separated beams toward the second diffraction grating. In some such embodiments, a different piezo-electric actuator is attached to each of the two mirrors 448 and 449 (i.e., rather than using the single piezo-electric actuator 327 on mirror 431) that are used to re-converge each of the two separated beams toward the second diffraction grating 413, wherein the two piezo-electric actuators allow independent adjustment of the lengths of the cavity 393 as seen by each intermediate beam, for tuning purposes. In other embodiments, single piezo-electric actuator 327 on mirror 431 is used in conjunction with an additional single piezo-electric actuator one or the other of mirrors 448 or 449, in order to independently tune the lengths of the cavity seen by the two intermediate-frequency beams. In these manners, in some embodiments, the cavity 393 can be independently frequency tuned (using the etalons 438-439 and/or diffraction grating 412 used in conjunction with a mask having two slits (one for each of the two intermediate-frequency beams) and length tuned (using the two piezo-electric actuators) to each of the two intermediate frequency beams, if desired.

In contrast to the device 301 embodiment shown in FIG. 3A, device 401 of FIG. 4A separates OPO crystal 325 from DFG crystal 335 so that each is in a separate respective leg of the bow-tie ring 393 (i.e., bow-tie ring 393 being the optical path from mirror 324, through OPO 325 to mirror 346, then through DFG 335 and mirror 353 to diffraction grating 412 and back (via slightly separate paths for the $I_S$ and $I_I$ beams) to mirror 431, then the $I_S$ beam goes through etalon 439 to mirror 449 and then to grating 413, while the $I_I$ beam goes through etalon 438 to mirror 448 and then to grating 413, where the $I_S$ and $I_I$ beams are combined into a single beam, and finally back to mirror 324), which allows removal of the pump light $I_P$ through wavelength-selective mirror 346 before the OPO-idler light $I_I$ and OPO-signal light $I_S$ enter the DFG crystal 335 to be converted to electromagnetic radiation of the THz output-signal frequency. This bow-tie ring path 393, which separates the $I_S$ and $I_I$ beams from one another by diffraction, allows each of the intermediate-frequency $I_S$ and $I_I$ beams to be filtered by an etalon specifically tuned for the two respective frequencies.

In other embodiments (not shown), a device that is the same as device 401 but omitting etalon 438 and mirror 448 is used, in order that the ring 393 is resonant only to the frequency of the $I_S$ beam (the $I_I$ beam being dumped), and only circulates the $I_S$ beam completely around the optical path of ring 393. In yet other embodiments (not shown), a device that is the same as device 401 but omitting etalon 439 and mirror 449 is used, in order that the ring 393 is resonant only to the frequency of the $I_I$ beam (the $I_S$ beam being dumped), and only circulates the $I_I$ beam completely around the optical path of ring 393. In these cases, the diffraction gratings 412 and 413 and the one etalon allow improved tuning and stability of the frequencies used to generate the THz output signal 350. In some embodiments, some of the optical elements that define the optical path of ring 393 are slightly out of the plane and tilted such that the optical elements do not interfere with the optical path 393.

Figure 4B:
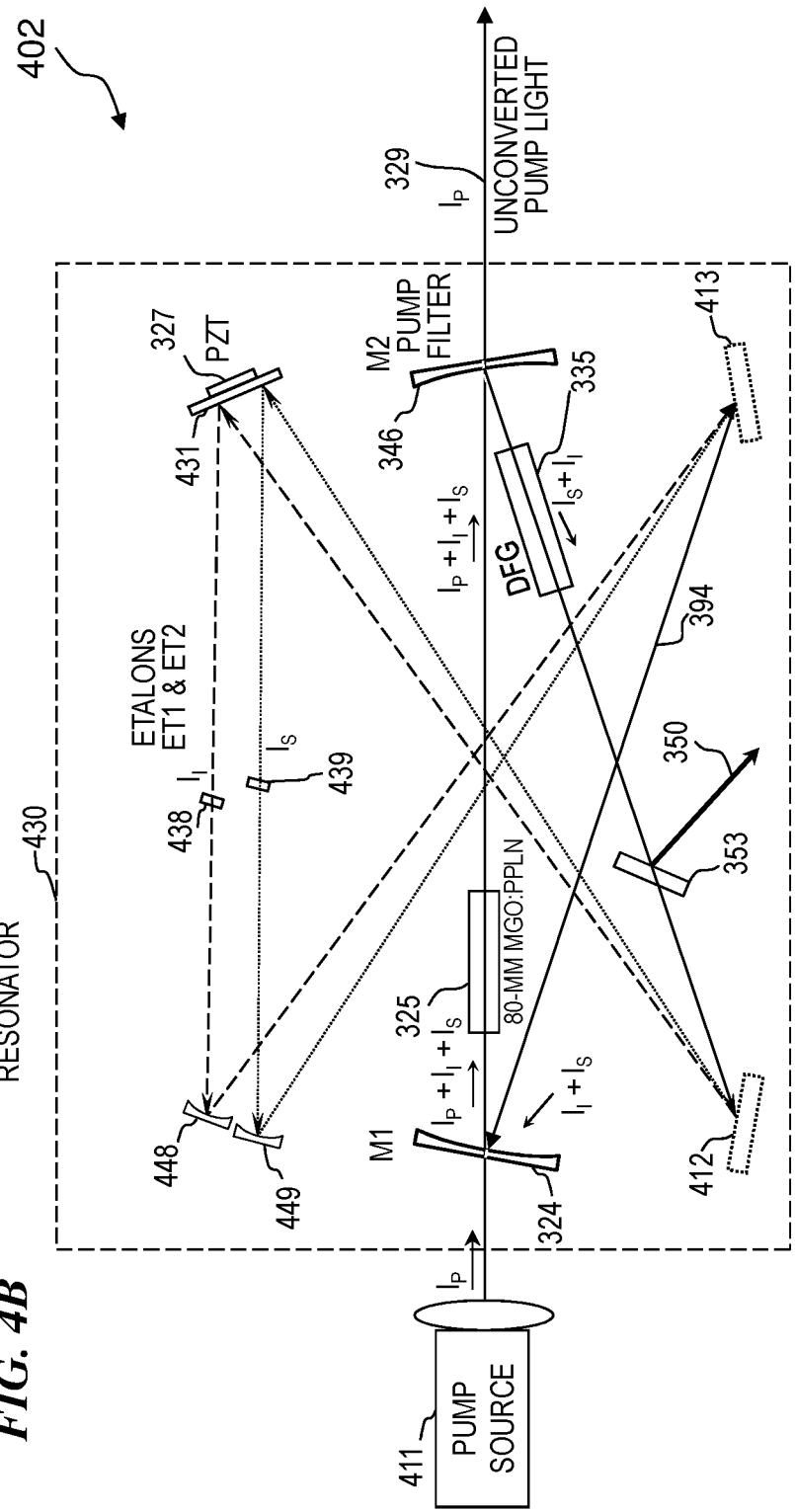
FIG. 4B is a block diagram of another four-mirror bow-tie combined OPO and DFG cavity device 402.

FIG. 4B is a block diagram of another four-mirror bow-tie combined OPO and DFG cavity device 402. The topology and operation of device 402 are substantially the same as for device 401 described above. In other embodiments (not shown), a device that is the same as device 402 but omitting etalon 438 and mirror 448 is used, in order that the ring 394 is resonant only to the frequency of the $I_S$ beam, and only circulates the $I_S$ beam completely around the optical path of ring 394. In yet other embodiments (not shown), a device that is the same as device 402 but omitting etalon 439 and mirror 449 is used, in order that the ring 394 is resonant only to the frequency of the $I_I$ beam, and only circulates the $I_I$ beam completely around the optical path of ring 394. In these cases, the diffraction gratings and etalon allow improved tuning of the frequencies used to generate the THz output signal 350. In some embodiments of device 402 (in contrast to some embodiment of device 401 described above), all of the optical elements that define the optical path of ring 394 are in a single plane and need not be tilted or out of the plane in order to not interfere with the optical path 394. In some embodiments, this causes the angles between segments of the optical path of ring 394 to be larger (less acute) than is the case for FIG. 5A described below.

Figure 5A:
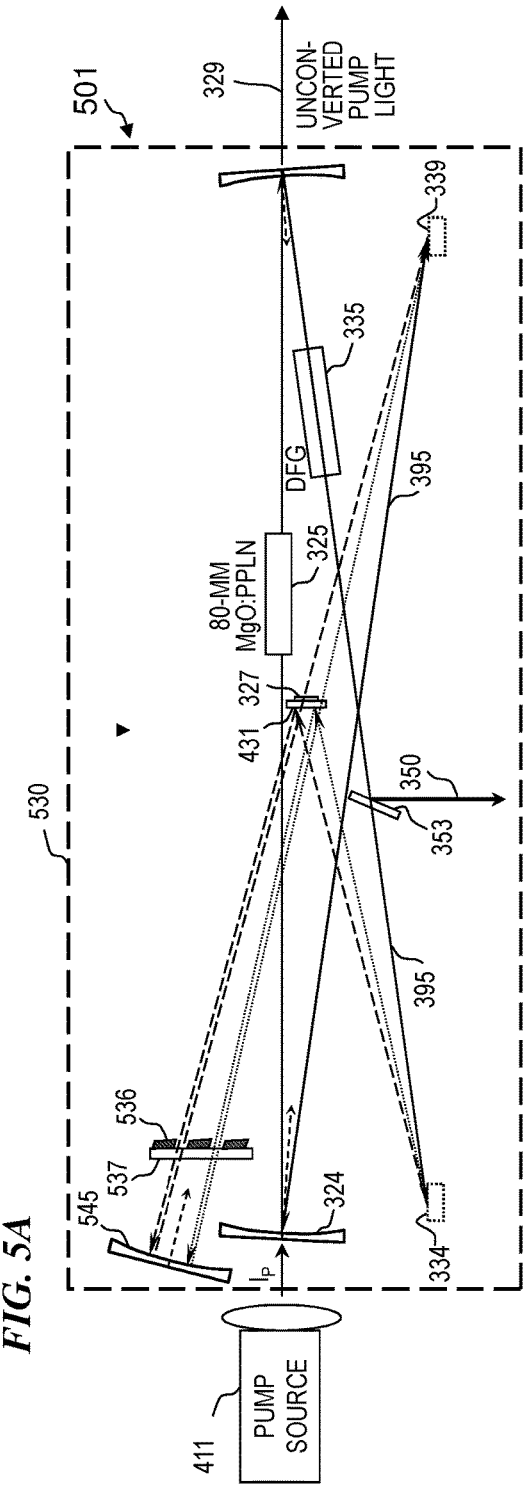
FIG. 5A is an elevation-view block diagram of another four-mirror bow-tie combined OPO and DFG cavity device 501.

FIG. 5A is an elevation-view block diagram of another four-mirror bow-tie combined OPO and DFG cavity device 501 having a bow-tie-ring optical path 395. The topology and operation of device 501 are substantially the same as for device 401 described above, except that device 501 uses a single etalon 537 (optionally having a mask 536 that has one opening for the $I_I$ beam and one opening for the $I_S$ beam) in place of the two etalons 438 and 439 of device 401, and device 501 uses a single cylindrical mirror 545 (optionally having a mask not shown here) in place of the two cylindrical mirrors 448 and 449 of device 401. In other embodiments, etalon 537 is omitted and mask 536, that has one slit opening for the $I_I$ beam and one slit opening for the $I_S$ beam, is used to select the two intermediate frequencies (in some such embodiments, mask 536 is configured to have one fixed slit for the fixed-frequency intermediate beam and one movable or adjustable-position slit for the adjustable-frequency intermediate beam). In contrast to beam-splitting diffractive grating 412 of FIG. 4A (which diffracts the $I_S$ beam on one side of the combined input beam that passes through output mirror 353 and diffracts the $I_I$ beam on the opposite side), beam-splitting diffractive grating 334 is configured to diffract the $I_S$ beam and the $I_I$ beam both along respective angled paths that are both above the combined input beam that passes through output mirror 353. Also in contrast to beam-combining diffractive grating 413 of FIG. 4A (which diffracts the $I_S$ beam from one side of the combined output beam that propagates toward mirror 324, and diffracts the $I_I$ beam from the opposite side), beam-combining diffractive grating 339 is configured to diffract the $I_S$ beam and the $I_I$ beam from their respective angled paths that are both above the combined output beam that propagates toward mirror 324.

The centers of the angle-separated $I_S$ beam and the $I_I$ beam each impinge on the single etalon 537 at slightly different angles, which allows the single etalon 537 to be used to simultaneously select (i.e., provide a narrow-linewidth optical filter function) for the two different frequencies desired for the $I_S$ beam and the $I_I$ beam (since the different angles of incidence provide a different spacing between the two faces of the etalon). Similarly, the two etalon-filtered beams can both be focussed by a single cylindrical mirror 545 (which is configured to retro-reflect each of the two beams) to a single spot on the recombining grating 339 in order to be spectral-beam combined into a single beam directed toward M1 mirror 324. In some embodiments, the angles of divergence of the $I_S$ beam and the $I_I$ beam as they leave beam-splitting diffractive grating 334 match the respective angles of convergence of the $I_S$ beam and the $I_I$ beam as they impinge toward beam-combining diffractive grating 339.

In other embodiments (not shown), one or the other of OPO-signal beam $I_S$ and OPO-idler beam $I_I$ are blocked, masked, or dumped such that only a single intermediate frequency (i.e., either OPO-signal beam $I_S$ or OPO-idler beam $I_I$) circulates completely around ring 395.

Figure 5B:
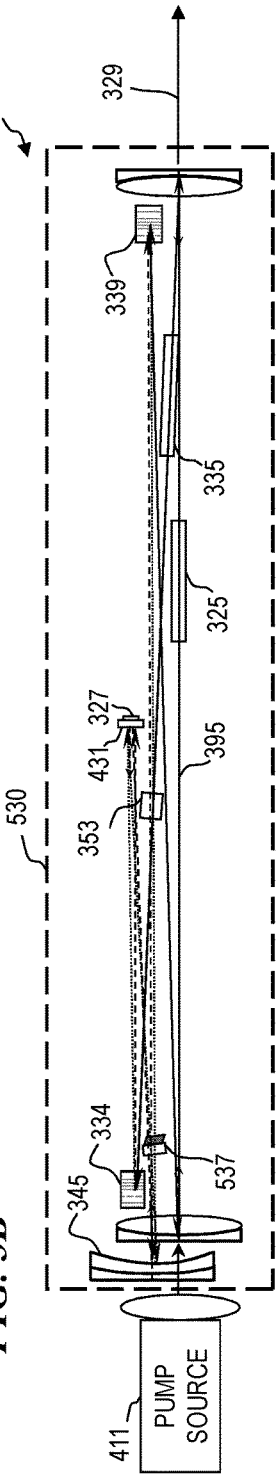
FIG. 5B is a plan-view block diagram of the four-mirror bow-tie combined OPO and DFG cavity device 501 shown in FIG. 5A.

FIG. 5B is a plan-view block diagram of the four-mirror bow-tie combined OPO and DFG cavity device 501 shown in FIG. 5A. This is simply a view from a different angle of the device 501 shown in FIG. 5A.

In the drawings herein, a dashed-line arrow is sometimes used to indicate the normal vector relative to the center of the mirror face.

In some embodiments, the present invention is mounted and sealed in a unitary housing having at least one removable cover and a plurality of optical ports for launching pump light $I_P$ into the OPO-DFG and removing $I_{THz}$, $I_S$ and $I_I$ light that result from the non-linear OPO conversion and difference frequency generation. In some embodiments, the housing is similar to that shown and described in co-owned U.S. Pat. No. 7,620,077, which is incorporated herein by reference.

In some embodiments, a set of up to four different-frequency output beams (i.e., $I_P$, $I_S$, $I_I$ and/or $I_{THz}$) exit from the device 301, 302, 401, 402 and/or 501, each beam of which can be used by itself, or in combination with other beams of this set, for various purposes such as spectroscopy, LIDAR, LADAR, materials engineering (such as heat treating and the like), chemical processing, imaging (such as airport security searches for hidden weapons, or locating firefighters or the like, who would have THz reflectors or resonators on their person that would be imaged once the THz output beam hit such a device, through smoke or in the dark), non-lethal or lethal weapons, surgical coagulation, cutting, and the like.

In some embodiments, the OPO and DFG are made into one crystal with different sections having different functions.

Novel attributes of some embodiments of the present invention include: (a.) high power, (b.) wide available spectral range, (c.) narrow-linewidth, (d.) widely tunable, (e.) compact, (f.) light-weight, and/or (g.) maintenance-free since they are fiber-laser based.

One purpose of this invention is to create a high-power, tunable, and narrow-linewidth millimeter-wave or terahertz-frequency systems that can use converted millimeter or terahertz waves for one set of functions, such as imaging, spectroscopy, non-lethal weapon and the like, while using its fundamental wavelength(s) that were not converted as output for another set of functions, such as coagulation, cutting, lethal weapons, and the like.

In some embodiments, the present invention uses two narrow-linewidth OPO-generated laser seed signals (called the OPO-signal and the OPO-idler, these are sometimes simply referred to as "seeds"), at least one of which is tunable in some embodiments, wherein in some embodiments, the OPO pump source uses a DFB seed laser that in turn is pumped by one or more semiconductor lasers. In some embodiments, these beams are operated in pulsed modes. In some embodiments, the seed signals are amplified in fiber amplifiers. Pulses from the two amplified seed signals are combined and sent through nonlinear difference-frequency-generation (DFG) optics. Electronics and/or algorithms and beam-shaping optics are used to synchronize and overlap precisely two pulses from the two fiber amplifiers' output through the DFG optics. Tunability of the seed lasers is achieved through drive conditions such as current or temperature, or acoustic optics and the like, which are applying to key laser-cavity elements such as grating or feedback mirrors. In some embodiments, an external enhancement cavity is used to improve DFG efficiency. In some embodiments, thulium-doped fiber amplifiers are used to amplify the two 2-μm (two-micron wavelength) signal lights for both power scalability and DEC (direct evaporative cooling) efficiency improvement. Also non-converted ~2-μm output power can be used for a number of other applications. Beam-shaping and -directing optics are employed to manipulate different output beams for different sets of applications. In some embodiments, DFG-conversion optics are controlled so that millimeter-wavelength terahertz output power is controlled.

In contrast to the present invention, electromagnetic signals in conventionally available commercial terahertz sources are typically generated through either a free-electron laser or a waveguide filled with gaseous organic molecules and generated through high-voltage discharge through the gaseous organic molecules. These sources are neither narrow-linewidth nor widely tunable. Further, they typically are not available in high-frequency ranges, and they are usually very large in size. A quantum cascade laser (QCL) has limited output power and can only produce certain frequencies and requires cryogenic cooling. Terahertz generation through femtosecond lasers are usually low power and not tunable. So, in summary, the problem posed by the combination of requirements has not been solved before.

In some embodiments, the present invention provides an apparatus for generating a gigahertz-terahertz-range signal having a frequency in a gigahertz to terahertz frequency range. This apparatus includes a pump laser that outputs pump light having a pump frequency; and a single cavity, operably coupled to the pump laser to receive the pump light, the single cavity having non-linear material in an optical path in the cavity that receives the pump light and generates light of two intermediate frequencies, and that uses the light of the two intermediate frequencies to generate the gigahertz-terahertz-range signal, wherein the gigahertz-terahertz-range signal has a frequency that is equal to a difference between the two intermediate frequencies.

In some embodiments, the optical path has a bow-tie ring topology, and wherein the single cavity further includes: a first frequency-selective mirror that is highly transparent to the frequency of the pump light and through which unconverted pump light is removed from the cavity, a second mirror that is highly reflective to at least a fixed frequency of the two intermediate frequencies, such that between 1% and 5% of the other of the two intermediate frequencies is transmitted through the second mirror, a third mirror that is highly reflective to the fixed frequency of the two intermediate frequencies, a frequency-selective Fabry-Perot etalon that is located in the optical path between the second mirror and the third mirror and that is configured to pass the fixed frequency of the two intermediate frequencies, a fourth frequency-selective mirror that is highly reflective to the fixed frequency of the two intermediate frequencies and highly transparent to the frequency of the pump light and through which the pump light is introduced into the cavity. In some such embodiments, the non-linear material in the single cavity includes: a first non-linear optical (NLO) crystal of that acts as an optical parametric oscillator, and a second non-linear optical (NLO) crystal that acts as a difference frequency generator, wherein the first NLO crystal and the second NLO crystal are located in the optical path between the fourth mirror and the first mirror.

In some embodiments, the optical path has a linear non-ring topology, and the non-linear material in the single cavity includes a single non-linear optical (NLO) crystal of that acts both as an optical parametric oscillator and as a difference frequency generator.

In some embodiments, the optical path has a ring topology, and the non-linear material in the single cavity includes a single non-linear optical (NLO) crystal of that acts both as an optical parametric oscillator and as a difference frequency generator.

In some embodiments, the optical path has a ring topology, and the non-linear material in the single cavity includes: a first non-linear optical (NLO) crystal of that acts as an optical parametric oscillator, a second non-linear optical (NLO) crystal that acts as a difference frequency generator, and a first mirror located in the optical path between the first NLO crystal and the second NLO crystal, wherein the first mirror is highly reflective at both of the two intermediate frequencies.

In some embodiments, the optical path has a ring topology, and wherein the non-linear material in the single cavity includes: a first non-linear optical (NLO) crystal located in the optical path that acts as an optical parametric oscillator, a second non-linear optical (NLO) crystal located in the optical path that acts as a difference frequency generator, and a first mirror located in the optical path between the first NLO crystal and the second NLO crystal, wherein the first mirror is highly reflective at both of the two intermediate frequencies and highly transmissive at the pump frequency.

In some embodiments, the optical path has a bow-tie ring topology, and the non-linear material in the single cavity includes: a first non-linear optical (NLO) crystal of that acts as an optical parametric oscillator, a second non-linear optical (NLO) crystal that acts as a difference frequency generator and that has a first face that receives light of the two intermediate frequencies and a second face that emits the gigahertz-terahertz-range signal, a first mirror located in the optical path between the first NLO crystal and the second NLO crystal, wherein the first mirror is highly reflective at both of the two intermediate frequencies and highly transmissive at the pump frequency, and wherein light of the two intermediate frequencies reflected by the first mirror enters the first face of the second NLO crystal, and a second reflector located in the optical path facing the second face of the second NLO crystal, wherein the second reflector is highly reflective at the gigahertz-terahertz-frequency range, such that the gigahertz-terahertz-range signal is reflected by the second reflector and exits the cavity.

In some embodiments, the optical path in the single cavity is configured to have a bow-tie ring topology.

In some embodiments, the optical path has a bow-tie ring topology, and the apparatus further includes a unitary block housing surrounding the single cavity, wherein the optical path is completely within the housing, and wherein the housing has at least one cover and a plurality of optical ports that are coupled to the optical path.

In some embodiments, the housing also holds the pump laser in the housing.

In some embodiments, the pump laser is configured to controllably vary the pump frequency, and the cavity is tuned to resonate at a fixed one of the two intermediate frequencies, such that the other of the two intermediate frequencies varies based on the varied pump frequency, and such that the frequency of the terahertz-range signal is controllably varied based on the varied pump frequency.

In some embodiments, the single cavity is arranged in a ring topology and further includes: a first frequency-selective mirror that is highly transparent to the frequency of the pump light and through which unconverted pump light is removed from the cavity, and highly transparent to the frequency of the gigahertz-terahertz-range signal and through which the gigahertz-terahertz-range signal is removed from the cavity, a second mirror that is highly reflective to at least a fixed frequency of the two intermediate frequencies, such that between 1% and 5% of the other of the two intermediate frequencies is transmitted through the second mirror, a third mirror that is highly reflective to the fixed frequency of the two intermediate frequencies, a frequency-selective Fabry-Perot etalon located in the optical path between the second mirror and the third mirror, and that is configured to pass the fixed frequency of the two intermediate frequencies, a fourth frequency-selective mirror that is highly reflective to at least the fixed frequency of the two intermediate frequencies and highly transparent to the frequency of the pump light and through which the pump light is introduced into the cavity. In some such embodiments, the non-linear material in the single cavity includes a single non-linear optical (NLO) crystal of that acts both as an optical parametric oscillator, and as a difference frequency generator, wherein the single NLO crystal is located in the optical path between the fourth mirror and the first mirror.

In some embodiments, the single cavity further includes: a first frequency-selective mirror that is highly transparent to the frequency of the pump light and through which unconverted pump light is removed from the cavity, a second mirror that is highly reflective to at least a fixed frequency of the two intermediate frequencies, such that between 1% and 5% of the other of the two intermediate frequencies is transmitted through the second mirror, a third mirror that is highly reflective to the fixed frequency of the two intermediate frequencies, a frequency-selective Fabry-Perot etalon located in the optical path between the second mirror and the third mirror, and that is configured to pass the fixed frequency of the two intermediate frequencies, a fourth frequency-selective mirror that is highly reflective to at least the fixed frequency of the two intermediate frequencies and highly transparent to the frequency of the pump light and through which the pump light is introduced into the cavity. In some such embodiments, the non-linear material in the single cavity includes: a first non-linear optical (NLO) crystal of that acts as an optical parametric oscillator located in the optical path between the fourth mirror and the first mirror, and a second non-linear optical (NLO) crystal that acts as a difference frequency generator, wherein the first NLO crystal and the second NLO crystal are located in the optical path between the fourth mirror and the first mirror, and a frequency-selective reflector located in the optical path between the second NLO crystal and the third mirror, wherein the frequency-selective reflector is configured to pass the two intermediate frequencies, and to reflect the gigahertz-terahertz-range signal out of the cavity.

In some embodiments, the optical path has a ring topology, and wherein the non-linear material in the single cavity includes material that acts as an optical parametric oscillator and material that acts as a difference frequency generator.

In some embodiments, the present invention provides a method for generating a gigahertz-terahertz-range signal having a frequency in a gigahertz to terahertz frequency range. This method includes: receiving pump light having a pump frequency into a single optical cavity; generating light of two intermediate frequencies within the single cavity by using energy from the pump light, and generating the gigahertz-terahertz-range signal within the single cavity by using the light of the two intermediate frequencies, wherein the gigahertz-terahertz-range signal has a frequency that is equal to a difference between the two intermediate frequencies.

In some embodiments of the method, the optical cavity has an optical path that has a bow-tie ring topology, and the method further includes: reflecting light of at least one of the two intermediate frequencies at a first frequency-selective mirror, and removing unconverted pump light from the cavity through the first frequency-selective mirror, reflecting light of a fixed frequency of the two intermediate frequencies at a second mirror, reflecting light of the fixed frequency of the two intermediate frequencies at a third mirror, passing light of the fixed frequency of the two intermediate frequencies through a frequency-selective Fabry-Perot etalon located in the optical path between the second mirror and the third mirror, reflecting light of the fixed frequency of the two intermediate frequencies at a fourth frequency-selective mirror introducing the pump light through fourth frequency-selective mirror into the cavity, converting pump light into light of the two intermediate frequencies using non-linear optical parametric oscillation in the optical path between the fourth mirror and the first mirror, and converting light of the two intermediate frequencies to electromagnetic radiation having a gigahertz-terahertz frequency using non-linear difference frequency generation, in the optical path between the fourth mirror and the first mirror.

In some embodiments of the method, the optical cavity has an optical path that has a bow-tie ring topology, and the method further includes: reflecting light of at least one of the two intermediate frequencies at a first frequency-selective mirror, and removing unconverted pump light from the cavity through the first frequency-selective mirror, reflecting light of a fixed frequency of the two intermediate frequencies at a second mirror, reflecting light of the fixed frequency of the two intermediate frequencies at a third mirror, passing light of the fixed frequency of the two intermediate frequencies through a frequency-selective Fabry-Perot etalon located in the optical path between the second mirror and the third mirror, reflecting light of the fixed frequency of the two intermediate frequencies at a fourth frequency-selective mirror introducing the pump light through fourth frequency-selective mirror into the cavity, converting pump light into light of the two intermediate frequencies using non-linear optical parametric oscillation in the optical path between the fourth mirror and the first mirror, and converting light of the two intermediate frequencies to electromagnetic radiation having a gigahertz-terahertz frequency using non-linear difference frequency generation, in the optical path between the first mirror and the second mirror.

In some embodiments, the present invention provides an apparatus for generating a gigahertz-terahertz-range signal having a frequency in a gigahertz to terahertz frequency range. This apparatus includes means for receiving pump light having a pump frequency into a single optical cavity; and means within the single cavity for generating light of two intermediate frequencies by using energy from the pump light, and for generating the gigahertz-terahertz-range signal by using the light of the two intermediate frequencies, wherein the gigahertz-terahertz-range signal has a frequency that is equal to a difference between the two intermediate frequencies.

In some embodiments, the optical cavity has an optical path that has a bow-tie ring topology, and the apparatus further includes: means for reflecting light of at least one of the two intermediate frequencies at a first frequency-selective mirror, and removing unconverted pump light from the cavity through the first frequency-selective mirror, means for reflecting light of a fixed frequency of the two intermediate frequencies at a second mirror, and transmitting between 1% and 5% of the other of the two intermediate frequencies through the second mirror, means for reflecting light of the fixed frequency of the two intermediate frequencies at a third mirror, means for passing light of the fixed frequency of the two intermediate frequencies through a frequency-selective Fabry-Perot etalon located in the optical path between the second mirror and the third mirror, means for reflecting light of the fixed frequency of the two intermediate frequencies at a fourth frequency-selective mirror introducing the pump light through fourth frequency-selective mirror into the cavity, means for converting pump light into light of the two intermediate frequencies using non-linear optical parametric oscillation in the optical path between the fourth mirror and the first mirror, and means for converting light of the two intermediate frequencies to electromagnetic radiation having a gigahertz-terahertz frequency using non-linear difference frequency generation, in the optical path between the fourth mirror and the first mirror.

In some embodiments, the optical cavity has an optical path that has a bow-tie ring topology, and the apparatus further includes: means for reflecting light of at least one of the two intermediate frequencies at a first frequency-selective mirror, and removing unconverted pump light from the cavity through the first frequency-selective mirror, means for reflecting light of a fixed frequency of the two intermediate frequencies at a second mirror, means for reflecting light of the fixed frequency of the two intermediate frequencies at a third mirror, means for passing light of the fixed frequency of the two intermediate frequencies through a frequency-selective Fabry-Perot etalon located in the optical path between the second mirror and the third mirror, means for reflecting light of the fixed frequency of the two intermediate frequencies at a fourth frequency-selective mirror introducing the pump light through fourth frequency-selective mirror into the cavity, means for converting pump light into light of the two intermediate frequencies using non-linear optical parametric oscillation in the optical path between the fourth mirror and the first mirror, and means for converting light of the two intermediate frequencies to electromagnetic radiation having a gigahertz-terahertz frequency using non-linear difference frequency generation, in the optical path between the first mirror and the second mirror.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). Further, some embodiments include fewer than all the components described as part of any one of the embodiments described herein.

All publications patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. Some embodiments of the present invention can be used as laboratory equipment.

As used herein the term "about" refers to ±10% inclusive. As used herein the term "most" refers to more than 50%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The term "in some embodiments" and the word "optionally" are used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural versions unless the context clearly dictates otherwise. For example, the term "a compound" or "at least one compound" may include a plurality of compounds, including mixtures thereof.

Throughout this application, various embodiments of this invention may be presented in a range format. It is to be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6, as well as fractions for those cases not requiring an integer number. This applies regardless of the breadth of the range.

Whenever a numerical range is indicated herein, it is meant to include any cited numeral (fractional or integer) within the indicated range. The phrases "ranging/ranges between" a first indicated number and a second indicated number and "ranging/ranges from" a first indicated number "to" a second indicated number are used herein interchangeably and are meant to include the first and second indicated numbers and all the fractional and integer numbers there between.

As used herein the term "method" refers to processes, manners, means, techniques and procedures for accomplishing a given task including those manners, means, techniques and procedures either known to, or readily developed from known processes, manners, means, techniques and procedures by practitioners of the optical, electrical, semiconductor, mechanical, chemical, pharmacological, biological, biochemical and medical arts.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

What is claimed is:

1. An apparatus for generating a gigahertz-terahertz-range signal having a first frequency in a gigahertz to terahertz frequency range, the apparatus comprising:
   a pump laser that emits output pump light having a pump frequency; and
   a single cavity, operably coupled to the pump laser to receive the pump light,
   wherein the single cavity includes a first non-linear material in an optical path in the cavity that receives the pump light and generates light that includes a first intermediate frequency and a second intermediate frequency,
   wherein the single cavity includes a wavelength separator-combiner that spatially separates the light of the first intermediate frequency from the light of the second intermediate frequency such that the light of the first intermediate frequency propagates along a first segment of the optical path and the light of the second intermediate frequency propagates along a second segment of the optical path, and that recombines the spatially separated light into a single beam,
   wherein the single cavity includes a second non-linear material in the optical path in the cavity that uses the light of the first intermediate frequency and the light of the second intermediate frequency to generate the gigahertz-terahertz-range signal, wherein the gigahertz-terahertz-range signal has a frequency that is equal to a difference between the two intermediate frequencies.

2. The apparatus of claim 1, wherein the wavelength separator-combiner includes at least one diffraction grating.

3. The apparatus of claim 1, further comprising
   a first frequency-selective etalon located in the first segment of the optical path and tuned to the first intermediate frequency.

4. The apparatus of claim 1, further comprising:
   a first frequency-selective etalon located in the first segment of the optical path and tuned to the first intermediate frequency; and
   a second frequency-selective etalon located in the second segment of the optical path and tuned to the second intermediate frequency.

5. The apparatus of claim 1, wherein the first non-linear material and the second non-linear material are both part of a single non-linear optical (NLO) crystal that acts both as an optical parametric oscillator and as a difference frequency generator.

6. The apparatus of claim 1,
   wherein the first non-linear material includes a first non-linear optical (NLO) crystal that acts as an optical parametric oscillator,
   wherein the second non-linear material includes a second non-linear optical (NLO) crystal that acts as a difference frequency generator,
   wherein the first NLO crystal and the second NLO crystal are spatially separated from one another, and
   wherein the apparatus further includes:
   a first mirror located in the optical path between the first NLO crystal and the second NLO crystal, wherein the first mirror is highly reflective at both the first intermediate frequency and the second intermediate frequency and highly transmissive at the pump frequency.

7. The apparatus of claim 1,
wherein the first non-linear material includes a first non-linear optical (NLO) crystal that acts as an optical parametric oscillator,
wherein the second non-linear material includes a second non-linear optical (NLO) crystal that acts as a difference frequency generator,
wherein the first NLO crystal and the second NLO crystal are spatially separated from one another, and
wherein the apparatus further includes:
a first mirror located in the optical path between the first NLO crystal and the second NLO crystal, wherein the first mirror is highly reflective at both the first intermediate frequency and the second intermediate frequency and highly transmissive at the pump frequency, and
a second reflector located in the optical path facing the second face of the second NLO crystal, wherein the second reflector is highly reflective at the gigahertz-terahertz-frequency range, such that the gigahertz-terahertz-range signal is reflected by the second reflector and exits the cavity.

8. The apparatus of claim 1, wherein the optical path in the single cavity is configured to have a bow-tie ring topology.

9. The apparatus of claim 1, further comprising a piezoelectric element, wherein the pump laser is configured to controllably vary the pump frequency using the piezoelectric element.

10. The apparatus of claim 1, wherein the optical path has a bow-tie ring topology, the apparatus further comprising:
a unitary block housing surrounding the single cavity, wherein the optical path is completely within the housing, wherein the housing has at least one cover and a plurality of optical ports that are coupled to the optical path, and wherein the housing also holds the pump laser in the housing.

11. The apparatus of claim 1,
wherein the pump frequency is 283.0188679 THz,
wherein the first intermediate frequency is about 142.009434 THz,
wherein the second intermediate frequency is about 141.009434 THz, and
wherein the first frequency is about 1.00000002 THz.

12. The apparatus of claim 1, further comprising:
a distributed-feedback (DFB) fiber laser that receives input pump light at a first pump wavelength and emits output pump light at a second pump wavelength, wherein the DFB fiber laser includes a rare-earth-doped fiber having a core and at least a first cladding layer, and a DFB grating operatively coupled to a portion of the rare-earth-doped fiber.

13. The apparatus of claim 1, wherein the wavelength separator-combiner includes:
a wavelength separator that spatially separates the light of the first intermediate frequency from the light of the second intermediate frequency such that the light of the first intermediate frequency propagates along the first segment of the optical path and the light of the second intermediate frequency propagates along the second segment of the optical path, and
a wavelength recombiner that recombines the spatially separated light into the single beam.

14. The apparatus of claim 1, further comprising:
a plurality of frequency-selective separators that remove the light of the first intermediate frequency, the light of the second intermediate frequency, the pump light, and the gigahertz-terahertz-range signal from the optical path each through different ports.

15. The apparatus of claim 1, further comprising:
a frequency-selective separator located outside of the single optical cavity that separates the pump light and the gigahertz-terahertz-range signal.

16. An apparatus for generating a gigahertz-terahertz-range signal having a frequency in a gigahertz to terahertz frequency range, the apparatus comprising:
means for receiving pump light having a pump frequency into a single optical cavity having an optical path;
means for generating light that includes a first intermediate frequency and a second intermediate frequency within the single cavity by using energy from the pump light;
means for spatially separating the light of the first intermediate frequency from the light of the second intermediate frequency such that the light of the first intermediate frequency propagates along a first segment of the optical path and the light of the second intermediate frequency propagates along a second segment of the optical path, and recombining the spatially separated light into a single beam; and
means for generating the gigahertz-terahertz-range signal within the single cavity by using the light of the two intermediate frequencies, wherein the frequency of the gigahertz-terahertz-range signal is equal to a difference between the two intermediate frequencies.

17. The apparatus of claim 16, wherein the optical path has a bow-tie ring topology, and wherein the apparatus further includes:
first means for reflecting light of the first intermediate frequency, and for removing unconverted pump light from the optical cavity through the first frequency-selective reflector;
second means for reflecting light of the first intermediate frequency;
third means for reflecting light of the first intermediate frequency;
means for passing light of the first intermediate frequency while blocking light of the second intermediate frequency;
fourth means for reflecting light of the first intermediate frequency;
means for introducing the pump light into the cavity;
means for converting the pump light into light of the first intermediate frequency and light of the second intermediate frequency; and
means for converting light of the first intermediate frequency and light of the second intermediate frequency to electromagnetic radiation having a gigahertz-terahertz frequency.

18. The apparatus of claim 16, further comprising:
means for removing the pump light and the gigahertz-terahertz-range signal; and
means for separating the pump light and the gigahertz-terahertz-range signal outside of the single optical cavity.

19. The apparatus of claim 16, further comprising:
means for tuning the pump frequency in order to change the frequency of the gigahertz-terahertz-range signal.

20. The apparatus of claim 1, further comprising:
a distributed-feedback (DFB) fiber laser that receives input pump light at a first pump wavelength and emits output pump light at a second pump wavelength, wherein the DFB fiber laser includes a rare-earth-doped fiber having a core and at least a first cladding layer, and a DFB grating operatively coupled to a portion of the rare-earth-doped fiber; and a stretching element operatively coupled to the DFB grating and configured to tune a wavelength of the DFB fiber laser.

* * * * *